United States Patent [19]

Cocks et al.

[11] 4,379,495

[45] Apr. 12, 1983

[54] WEIGHING SCALE WITH LOW SUSCEPTIBILITY TO VIBRATION

[75] Inventors: Michael H. Cocks; Gary A. Evans, both of Dayton, Ohio

[73] Assignee: Hobart Corporation, Troy, Ohio

[21] Appl. No.: 258,212

[22] Filed: Apr. 27, 1981

[51] Int. Cl.³ ............................................. G01G 23/10
[52] U.S. Cl. ............................................. 177/1; 177/25; 177/185; 364/466; 364/575
[58] Field of Search ............ 177/25, 50, 185, DIG. 3, 177/1; 364/466, 567, 734, 811, 575

[56] References Cited

U.S. PATENT DOCUMENTS

| | | | |
|---|---|---|---|
| 3,674,097 | 7/1972 | Gile | 177/25 X |
| 3,701,106 | 10/1972 | Loshbough | 235/92 WT |
| 3,826,319 | 7/1974 | Loshbough | 177/25 |
| 3,921,736 | 11/1975 | Rogers | 177/DIG. 3 |
| 3,984,667 | 10/1976 | Loshbough | 177/25 X |
| 4,029,161 | 6/1977 | Foster et al. | 177/25 |
| 4,037,095 | 7/1977 | Howells | 364/575 X |
| 4,043,412 | 8/1977 | Rock | 177/25 |
| 4,063,604 | 12/1977 | Rock | 177/25 |
| 4,137,568 | 1/1979 | Dlugos | 364/575 X |

Primary Examiner—Joseph W. Hartary
Attorney, Agent, or Firm—Biebel, French & Nauman

[57] ABSTRACT

A method and apparatus for determining a representative average weight reading is disclosed, based on a series of weight readings from a scale subject to vibrations. Signals are generated at regular intervals, representative of the weight readings from said scale. Each new weight signal is compared with the previous weight signal, and one of two alternative labels is assigned to each new weight signal according to whether it is greater or less than the previous weight signal, and the opposite of the previous label is assigned if the signals are equal. The weight signals occurring in a weight averaging interval, which extends from a label change in one direction to the next label change in the same direction, are then averaged.

8 Claims, 15 Drawing Figures

FIG-3

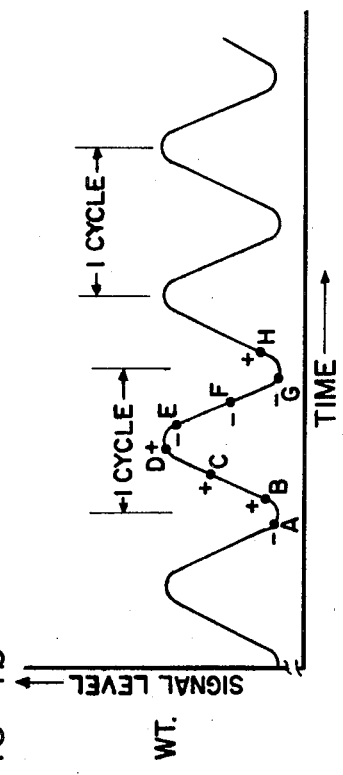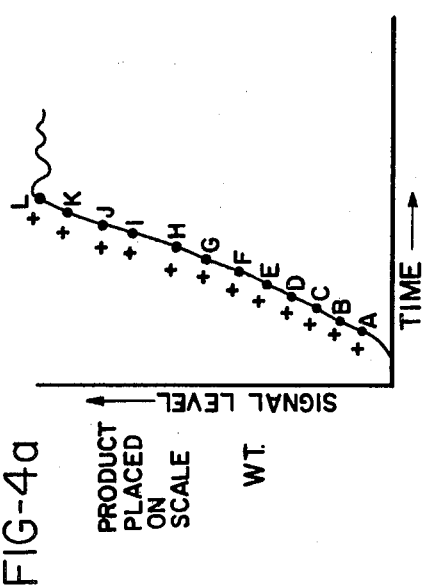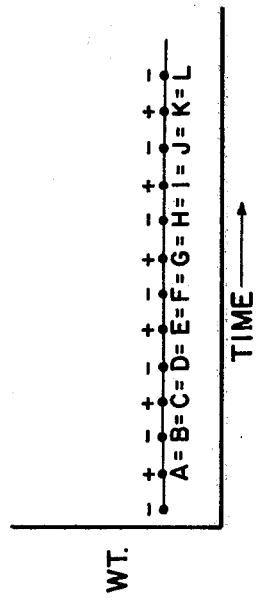
FIG-4a
FIG-4b
FIG-4c

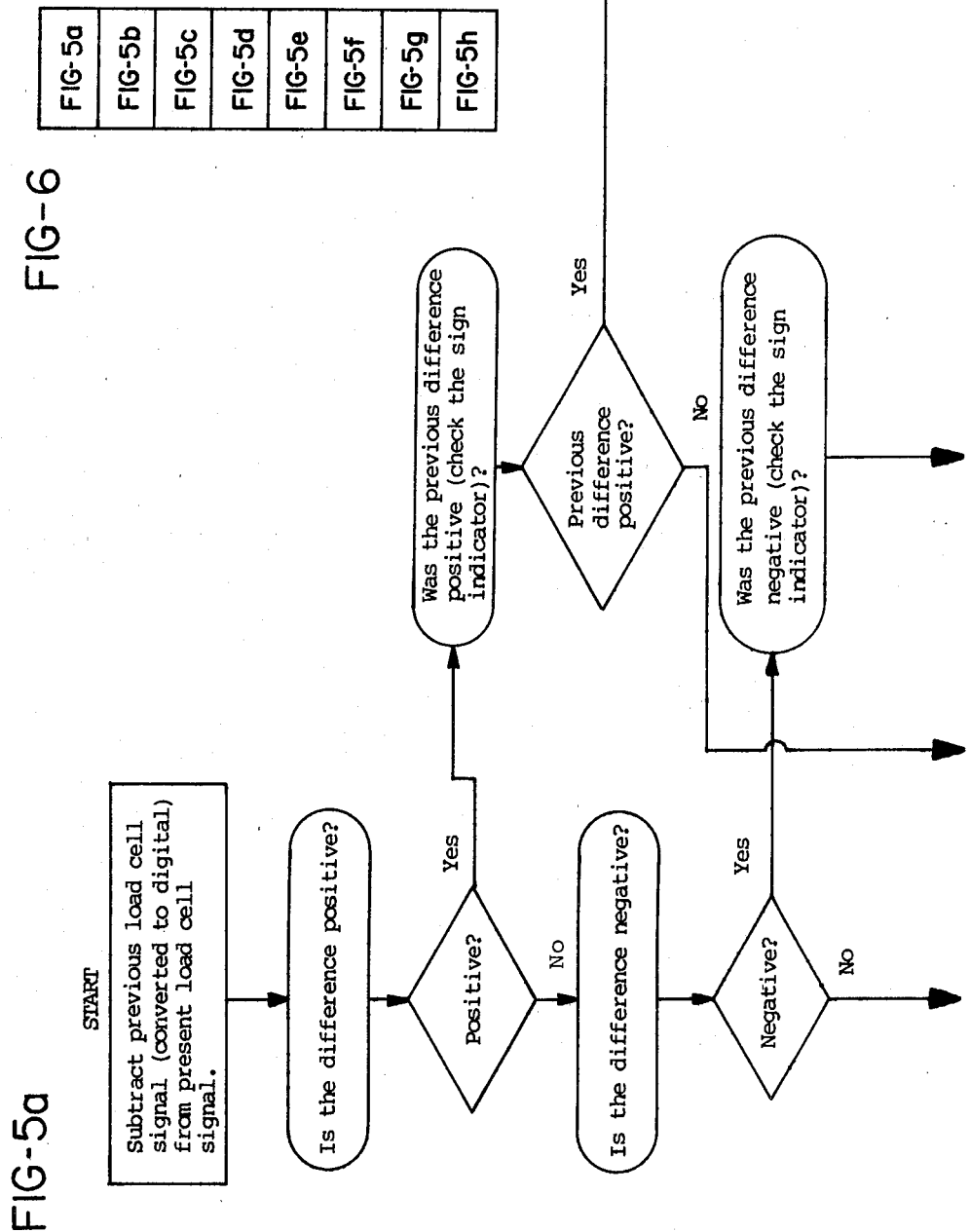

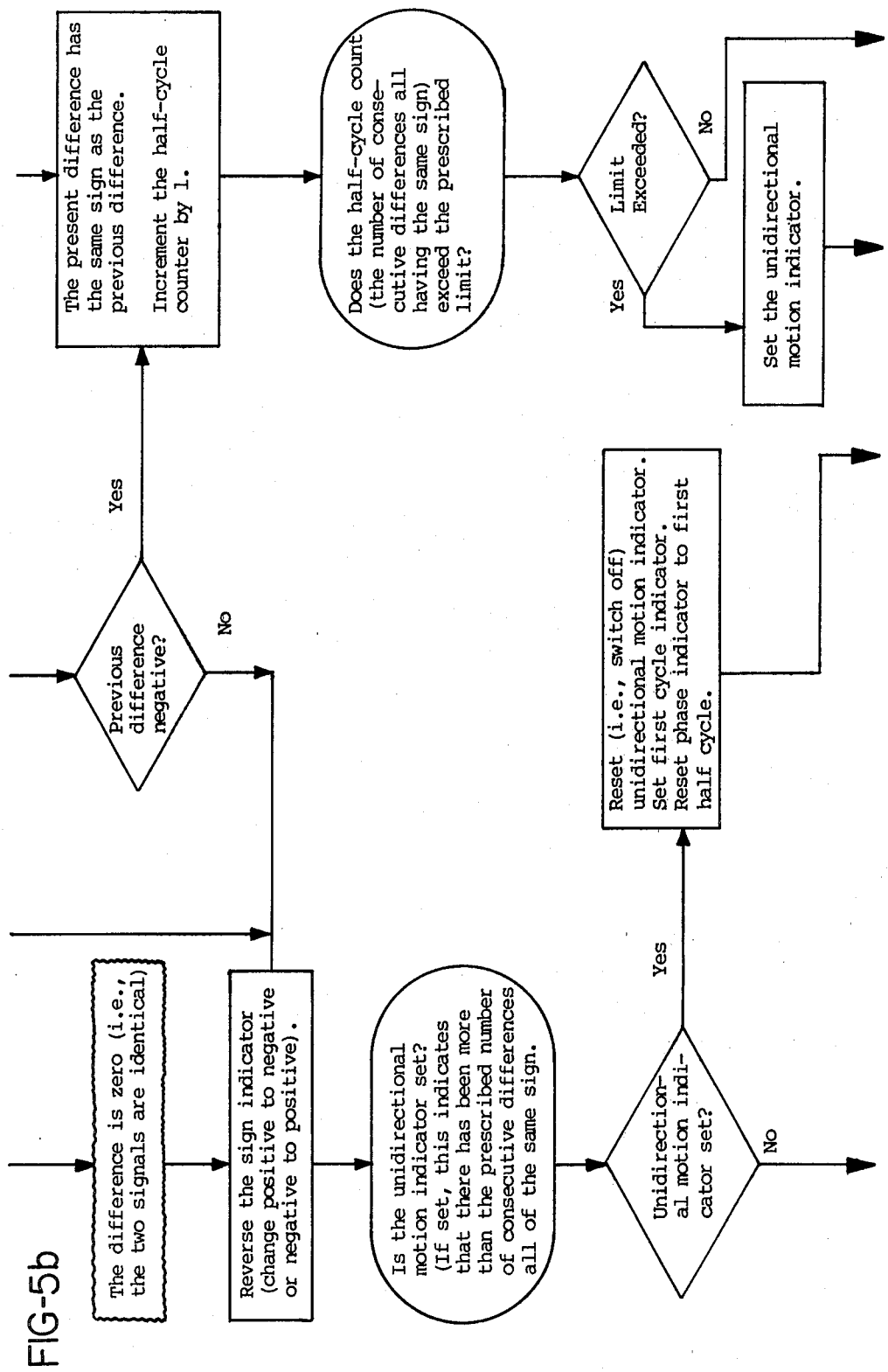

WEIGHING SCALE WITH LOW SUSCEPTIBILITY TO VIBRATION

BACKGROUND OF THE INVENTION

This invention relates to a weighing scale with reduced susceptibility to vibration.

In a typical load-cell scale, an analog voltage from the load-cell element of the scale is filtered by a low-pass analog filter and sampled at regular intervals by an analog-to-digital converter. The resultant digital signals are transmitted to circuit means for computing the weight and performing various other functions, such as calculating price.

When a weight is placed on the scale (or removed from it), successive digital signals initially increase (or decrease) continuously for a short time. In the absence of mechanical vibration and electrical noise, the value of these digital signals eventually becomes constant, and the scale is then said to be "out of motion". Computations of the weight of the object on the scale are based on this final constant value of the weight signal. The determination of when the scale is out of motion is particularly important in preventing weighing errors due to premature transmission of signals to a utilization device such as an electronic cash register (ECR) or printer.

If the scale is subject to vibration at frequencies which are passed through or only partially attenuated by the analog filter, successive digital signals may continue to fluctuate in an oscillatory manner after the initial unidirectional variation has ceased. In order to weigh the object on the scale it is then necessary to identify the constant value of the signals underlying the fluctuations. The "out-of-motion" condition is then redefined as existing when the variation in the successive signals has become small enough to permit such identification of the constant underlying value.

When signals of constant magnitude recur with sufficient frequency, a limited number of intervening signals which deviate slightly from the constant value can be ignored, and the constant or large value of the remaining signals identified. In combination with the analog filter, this affords a limited amount of protection against moderate vibration.

U.S. Pat. No. 3,921,736 discloses a motion detector in which a weighing scale (not necessarily a load-cell scale) is designated as being in motion when a specified number of signal magnitude changes occur in one direction without an intervening change in the opposite direction. This criterion is applied without regard to any intervening signals which have the same magnitude as their predecessors. This prior art device can similarly afford a limited degree of protection against moderate vibration when used with a suitable low-pass filter or with a scale having appreciable mechanical damping.

However, with either of these approaches, a representative target value cannot be identified in the presence of substantial vibration, and therefore an accurate value of the weight cannot be computed unless the response of the scale is very sluggish.

In some commercial applications, for example, supermarket scales, rapid response of the scale when a weight is placed on it is also an important requirement. Indeed, competition of the market place impedes minimum acceptable standards of weighing speed, and there is a demand for faster weighing capabilities. Thus, the extent to which the vibration-susceptibility of a scale can be reduced by reducing the range of frequencies transmitted by the low-pass analog filter is limited by the fact that this also reduces the speed of response when a weight is placed on the scale.

For example, in one commercial supermarket scale in which the analog filter was designed to provide the best compromise between vibration susceptibility and weighing speed characteristics, a steady weight reading may be obtained in about 0.5 to 1 second (depending on the magnitude of the weight applied) when the scale rests on a rigid, vibration-free surface, such as a concrete floor. On a table or laboratory bench, this time required to reach an accurate weight is increased by up to a factor of 2 or 3 due to the vibration induced in the table by the application of the weight. In the presence of significant externally-induced vibration having a frequency below 10 Hz, it is not possible to achieve a steady weight reading at all.

The demands of the market place require the development of scales having even faster speeds of response. In such scales, the analog filter will afford even less protection against vibration.

SUMMARY OF THE INVENTION

This invention relates to a method and apparatus for enabling a load-cell scale to yield a steady accurate weight reading even in a severely vibrating environment. Alternatively, in a moderately vibrating environment, the invention permits the use of a faster analog filter (i.e., a filter having higher cut-off frequency), thus reducing the time required to reach an accurate weight reading after the application of a weight to the scale.

Furthermore, a scale incorporating the present invention may be operated on a non-rigid surface in a moderately vibrating environment with relatively little reduction in weighing speed compared with the weighing speed on a rigid surface.

This invention achieves these improvements by enabling the scale to identify an out-of-motion condition and to yield a steady weight reading even when the output voltage from the analog filter is oscillating with moderately large amplitude.

As an initial step in processing the signals, the present invention distinguishes between unidirectional and oscillatory variations in the digital signals developed by the analog-to-digital converter from the filtered output voltage of the load cell. Unidirectional motion is identified by the occurrence of a specified number of consecutive changes in the signal magnitude all occurring in the same direction. This differs from the method of detecting motion in U.S. Pat. No. 3,921,736 in that in the present invention successive identical signals are treated as representing reversals in the direction of change, whereas they are disregarded in the motion detector described in the above patent.

When this test does not indicate the occurrence of unidirectional motion or when unidirectional motion ceases to occur, the successive signals may either vary in an oscillatory manner (i.e., consist of an oscillatory component superimposed on a constant or slowly-varying underlying signal), or they may be constant. Under these conditions, groups of successive signals are averaged, and successive averages are compared. Rather than averaging an arbitary number of signals, which might result in the inclusion of one or two signals from a partial cycle, not necessarily symmetrically arranged about the underlying constant signal value, or averaging a large number of readings, which would therefore be needed to achieve the required degree of accuracy and which would be prohibitively time-consuming, the present invention selects the groups of signals to be averaged in a special manner. In the present invention, each group of digital signals to be averaged consists of all the digital signals derived from one complete cycle of the oscillating analog signal. In this way, a high degree of accuracy is achieved by averaging a relatively small number of signals.

These groups of signals are identified by comparing each new digital weight signal with the previous digital weight signal and assigning one of two contrasting labels to the new weight signal, depending on whether it is greater than, less than, or equal to the preceding signal. For convenience, the labels will be referred to as positive (+) and negative (−). However, any other pair of labels, for example, 0 & 1, A & B, yes & no, up & down, black & white, etc., could equally well be used without changing the nature of the invention. In using positive and negative labels, it must be understood that a negative label does not confer a negative value on the signal.) Thus, if the new weight signal is greater than the previous signal, then a positive label (+) is assigned to it; if less, a negative label (−); and if equal to the previous signal, a sign opposite from the previous label is assigned to it.

A weight-averaging interval, corresponding to one complete cycle of the oscillating analog signal, then extends from a sign change occurring in one direction to the next sign change occurring in the same direction (with one intervening sign change in the opposite direction).

In the preferred embodiment of the invention, a counter is employed to count the number of digital weight signals occurring during the weight-averaging interval. An addition register totals the magnitudes of the weight signals which are generated during this weight-averaging interval, and means are employed to divide the accumulated total by the number of weight signals occurring during the weight-averaging interval.

This invention therefore provides a method and apparatus for identifying a representative average weight reading from a series of weight readings from a scale when it is subject to vibrations (as well as when it is not subject to vibrations). The method in its simplest form comprises the following steps:

(a) Generating weight signals representing the output of the scale at regular intervals, (b) comparing each new weight signal with the previous signal and assigning one of two labels to each new weight signal according to whether it is greater or less than the previous weight reading, the opposite of the previous label being assigned if the weights are equal, and (c) averaging the weight signals occurring in a weight averaging interval which extends from a label change in one direction to the next label change in the same direction.

More specifically, the method may include the following additional steps:

(d) Designating the scale as being in unidirectional motion if more than a specified number of signals all having the same label have been received, (e) if not in unidirectional motion, counting the number of weight signals occurring in a weight-averaging interval extending from a label change in one direction to the next label change in the same direction, (f) accumulating a total of the weight signal magnitudes generated during the weight-averaging interval, (g) dividing the accumulated total of the weight signal magnitudes by the number of weight signals occurring during the weight-averaging interval, thereby to provide an average weight reading, and (h) comparing successive averages to determine whether the scale is out of motion.

It is therefore an object of this invention to provide a method for determining a representative average weight reading based on a series of weight readings from a scale subject to vibrations comprising the steps of generating signals at regular intervals representative of the weight reading from said scale, and averaging the weight signals occurring during one complete vibrational cycle, or integral multiple thereof. More specifically, the step of averaging includes comparing each new weight signal with the previous weight signal, assigning one of two alternative labels to each new weight signal according to whether it is greater or less than the previous weight signal, assigning the opposite of the previous label if the signals are equal, and averaging the weight signals occurring in a weight averaging interval which extends from a label change in one direction to the next label change in the same direction.

It is a further object of this invention to provide an apparatus for determining a representative average weight reading from a series of weight readings from a scale subject to vibrations comprising means for generating signals at regular intervals representative of a weight placed on said scale, means for comparing each new weight signal with the previous weight signal, means for assigning one of two alternative labels to each new weight signal according to whether it is greater or less than the previous weight signal, and for assigning the opposite of the previous label if the signals are equal, and means for averaging the weight signal occurring in a weight averaging interval extending from a label change in one direction to the next label change in the same direction.

Other objects and advantages of the invention will be apparent from the following description, the accompanying drawings and the appended claims.

BRIEF DESCRIPTION OF THE DRAWINGS

FIG. 3 is a memory map which identifies the locations within a random access memory of the various components shown in FIG. 2;

FIG. 4a is a chart showing weight readings with respect time when a weight has been placed upon the load-cell;

FIG. 4b is a chart showing weight readings which are oscillating due to vibrations applied to the scale;

FIG. 4c is a chart showing a steady state series of weight readings; produced by a constant scale output.

FIGS. 5a–5h together comprise a flow chart illustrating the decisions which are made by the circuits shown in FIGS. 1 and 2 in deriving a scale-in-motion output and an average weight reading;

FIG. 6 illustrates the arrangement of FIGS. 5a–5h.

DESCRIPTION OF THE PREFERRED EMBODIMENT

Figure 1:
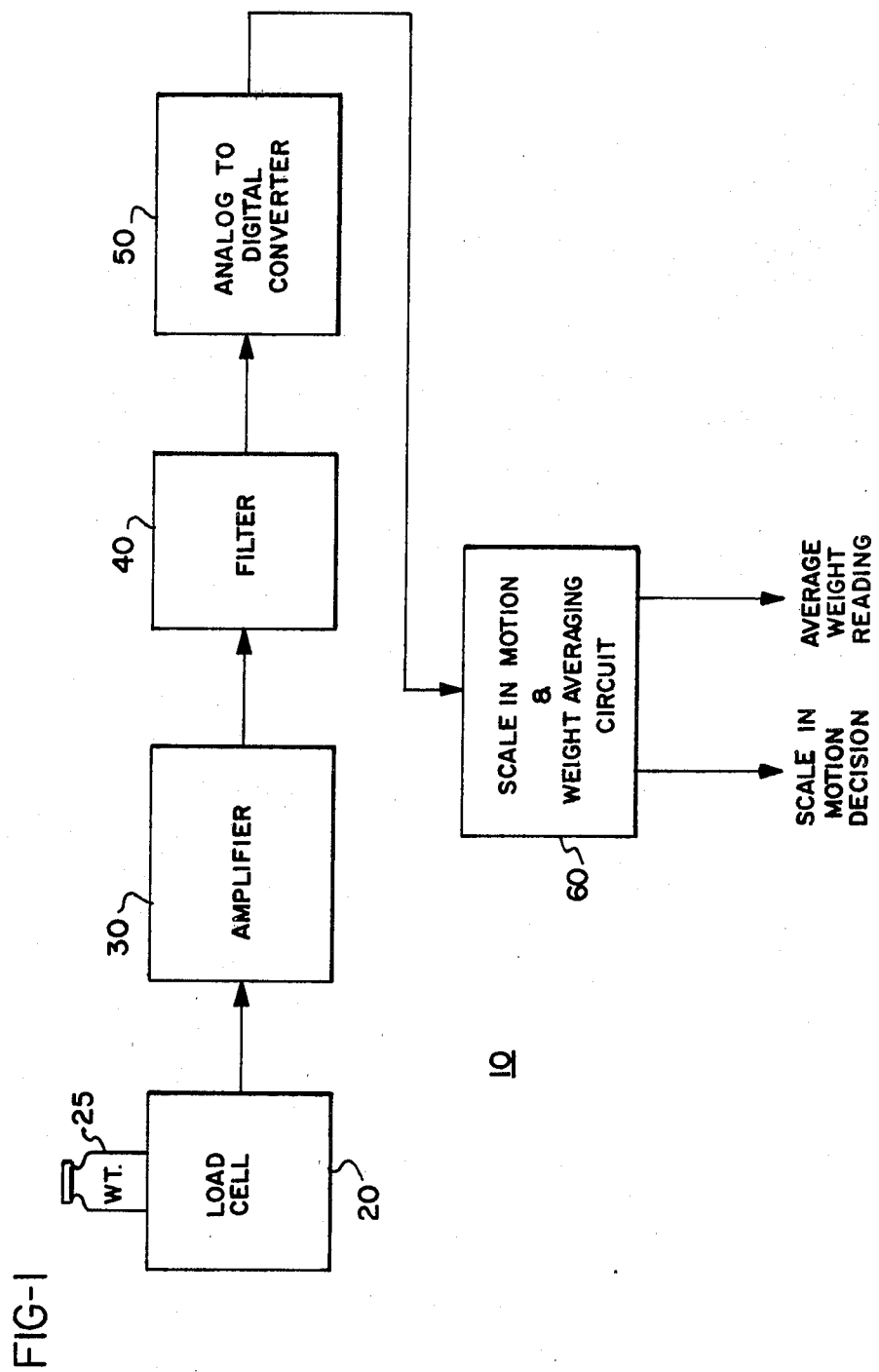
FIG. 1 is an electrical block diagram showing the basic components which make up that portion of a load-cell scale incorporating the present invention.

Referring now to the drawings which illustrate a preferred embodiment of the invention, and particularly to FIG. 1, a load-cell scale 10 includes a load-cell 20 on which a weight 25 may be placed. The output of the load cell 20 is an analog voltage which is applied through an amplifier 30 and filter circuit 40 to an analog-to-digital (A-D) converter circuit 50. The A-D converter 50 samples the analog signal at regular intervals and supplies a digital representation of the scale output to a scale-in-motion and weight averaging circuit 50. The output of the circuit 60 is an average reading corresponding to the weight on the load cell and an in-motion or out-of-motion decision. A reading corresponding to zero weight must be subtracted from the average reading in order to compute the weight.

Figure 2:
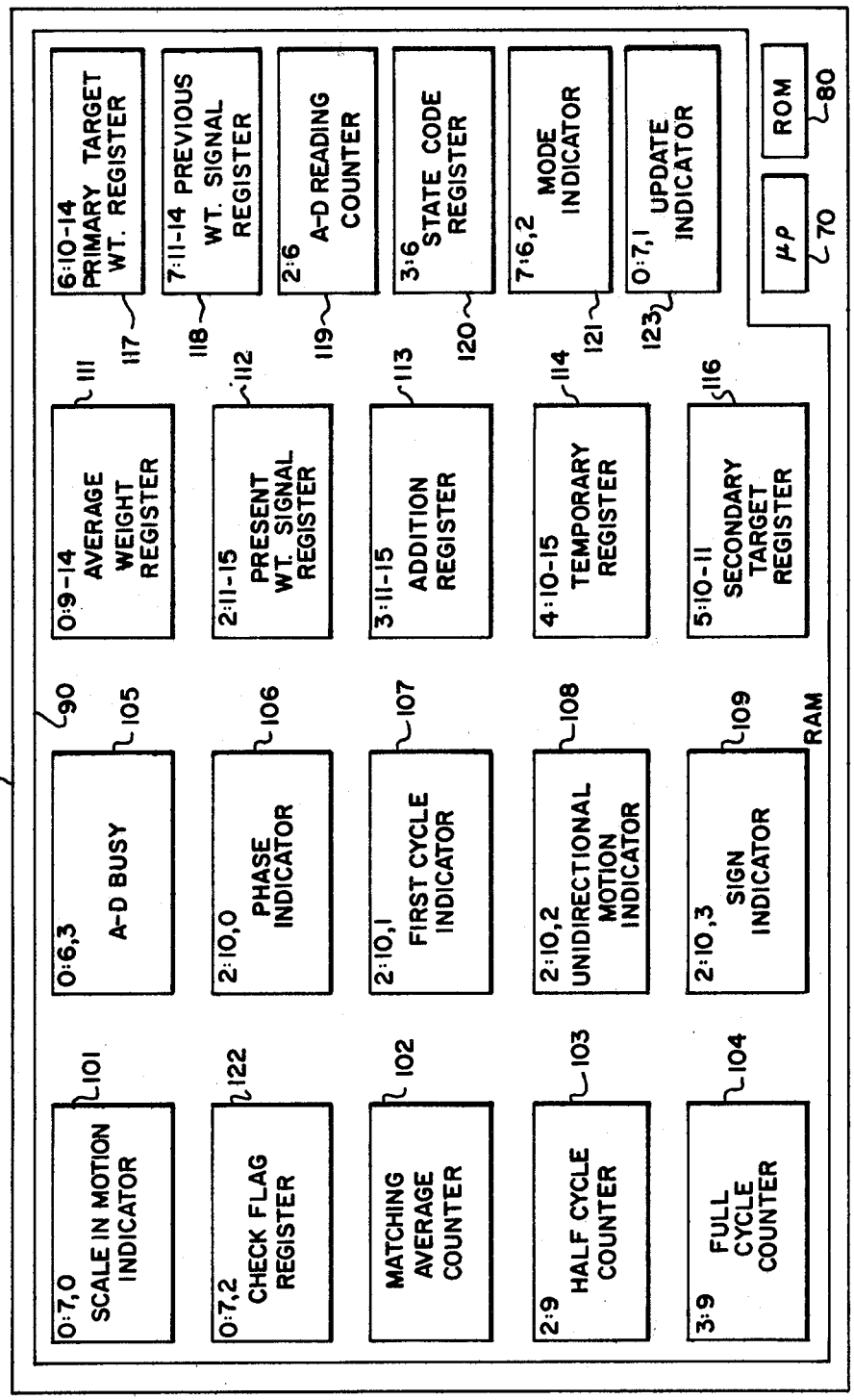
FIG. 2 is a block diagram of the major items of information storage used in the scale-in-motion and weight averaging circuit.
Figure 5C:
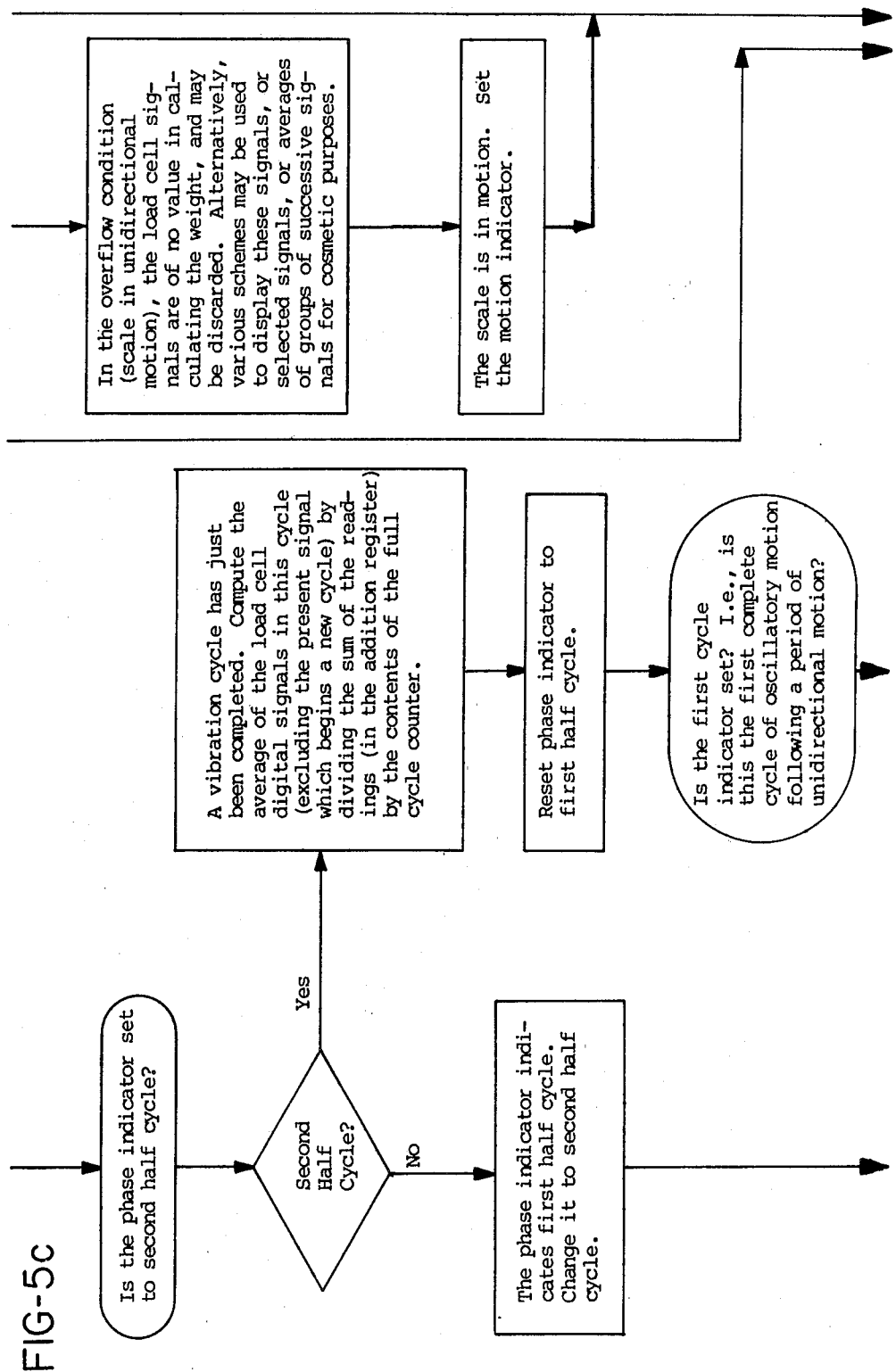
Figure 5D:
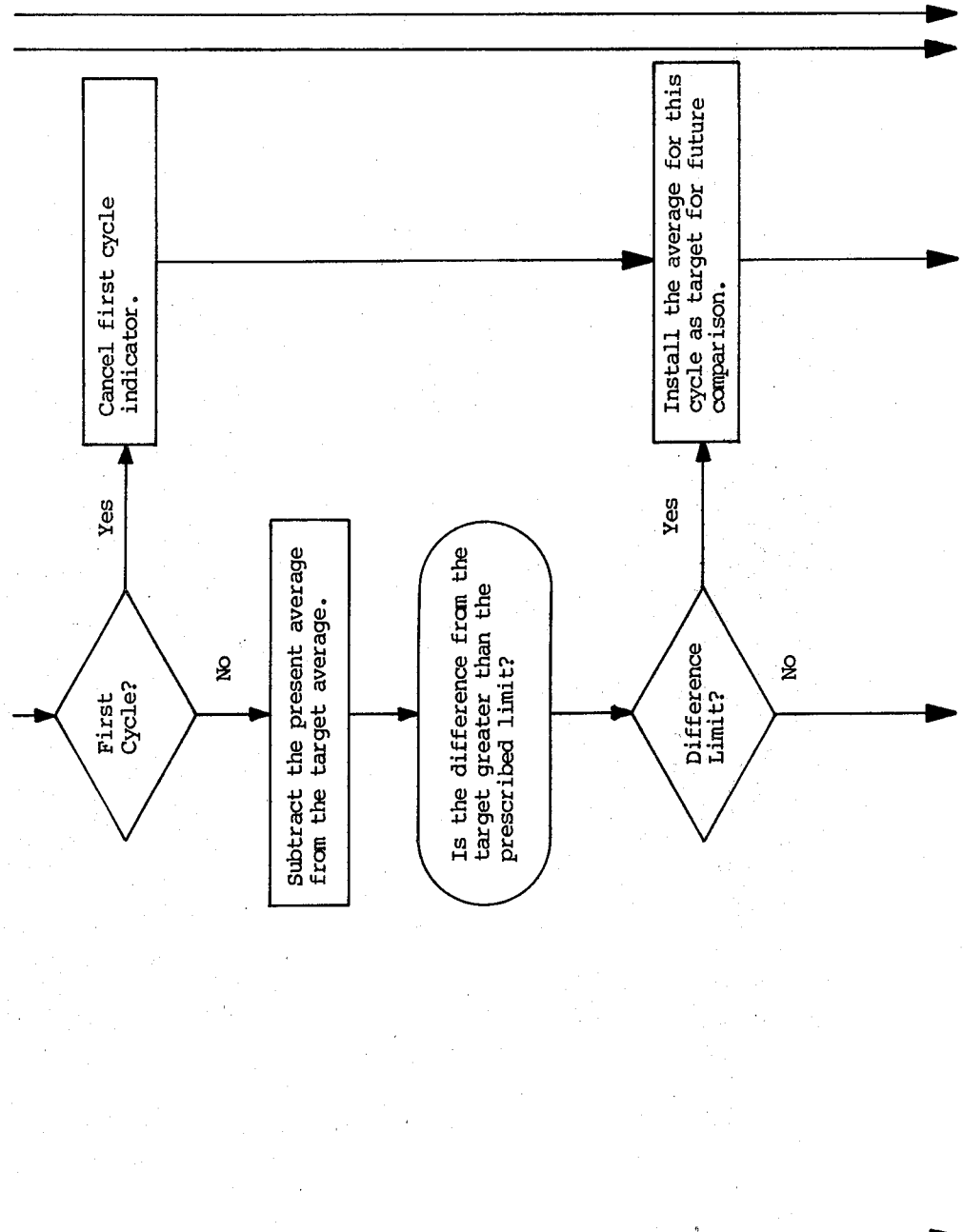
Figure 5E:
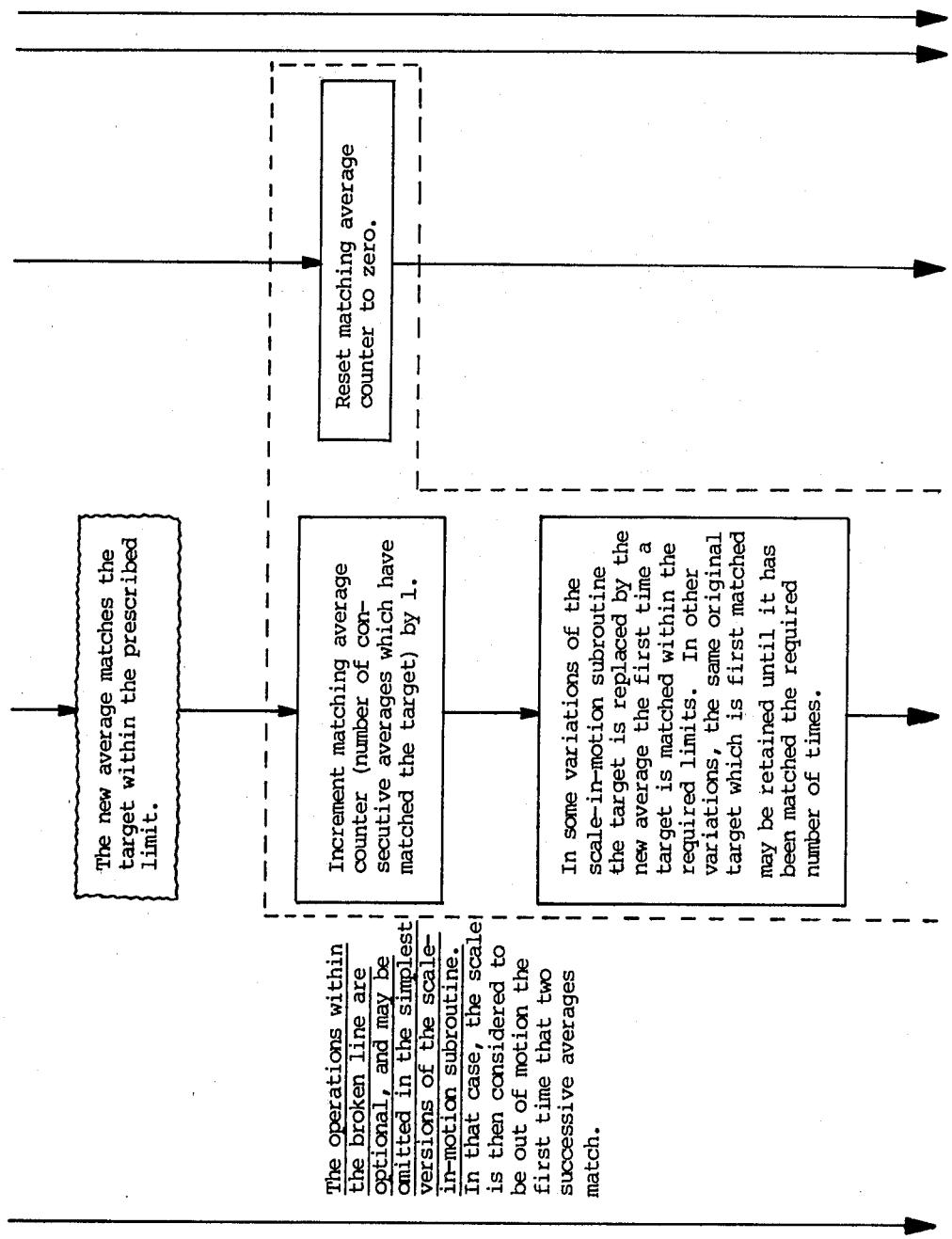
Figure 5F:
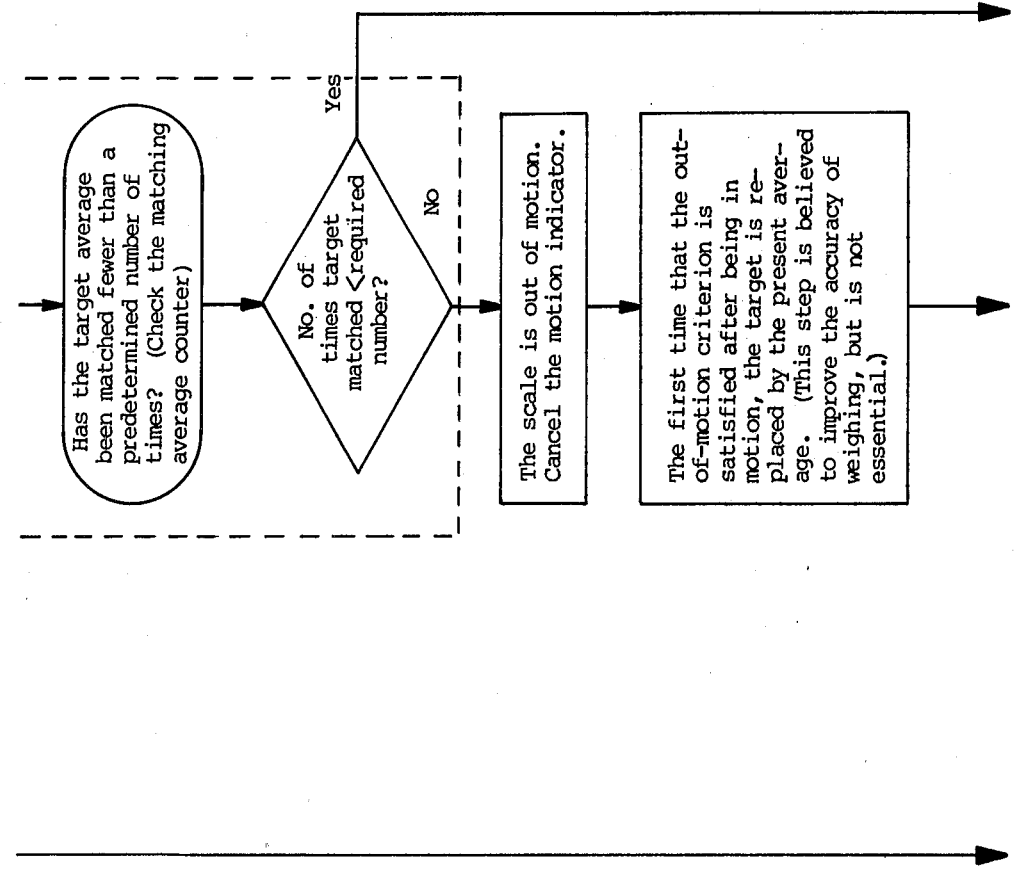
Figure 5G:
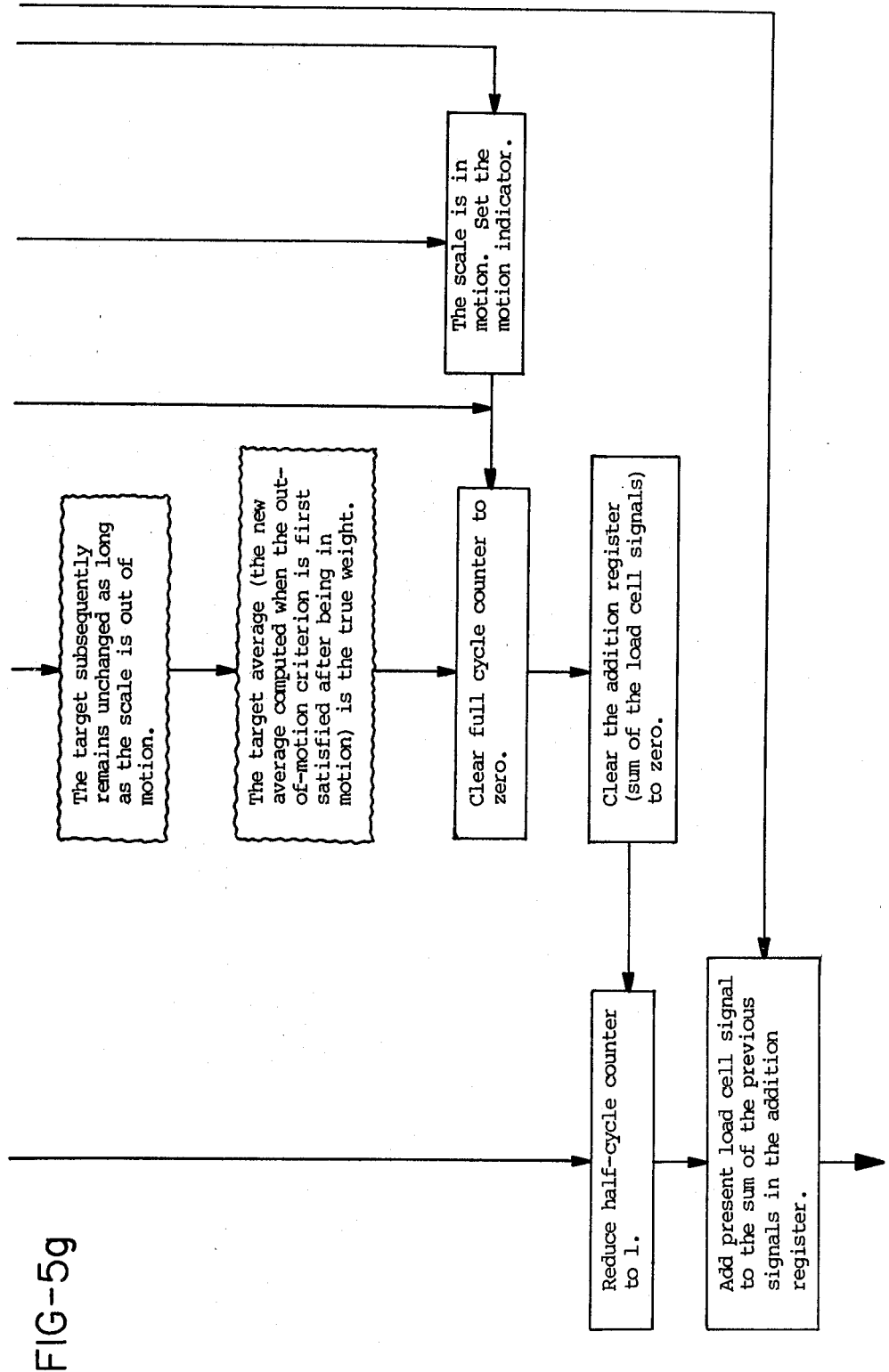
Figure 5H:
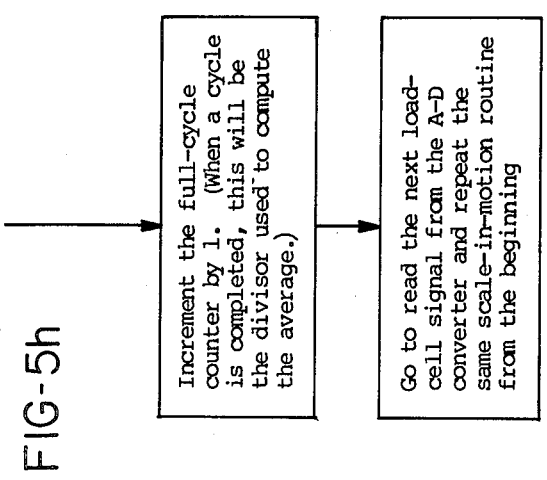

The scale-in-motion and weight averaging circuit 60, shown more completely in FIG. 2, includes a microprocessor 70, a program read-only memory (ROM) 80, and several other components defined within a random-access memory (RAM) 90 which functions under the control of the microprocessor. These components include a scale-in motion indicator 101, an optional matching average counter 102, a half cycle counter 103, a full cycle counter 104, a phase indicator 106, a first cycle indicator 107, a unidirectional motion indicator 108, a sign indicator 109, an average weight register 111, a present weight signal register 112, an addition register 113, a temporary register 114, a secondary target register 116, a primary target weight register 117, a previous weight signal register 118, an A-D reading counter 119, a state code register 120, a mode indicator 121, a check flag register 122, and an update indicator 123.

Figure 3:
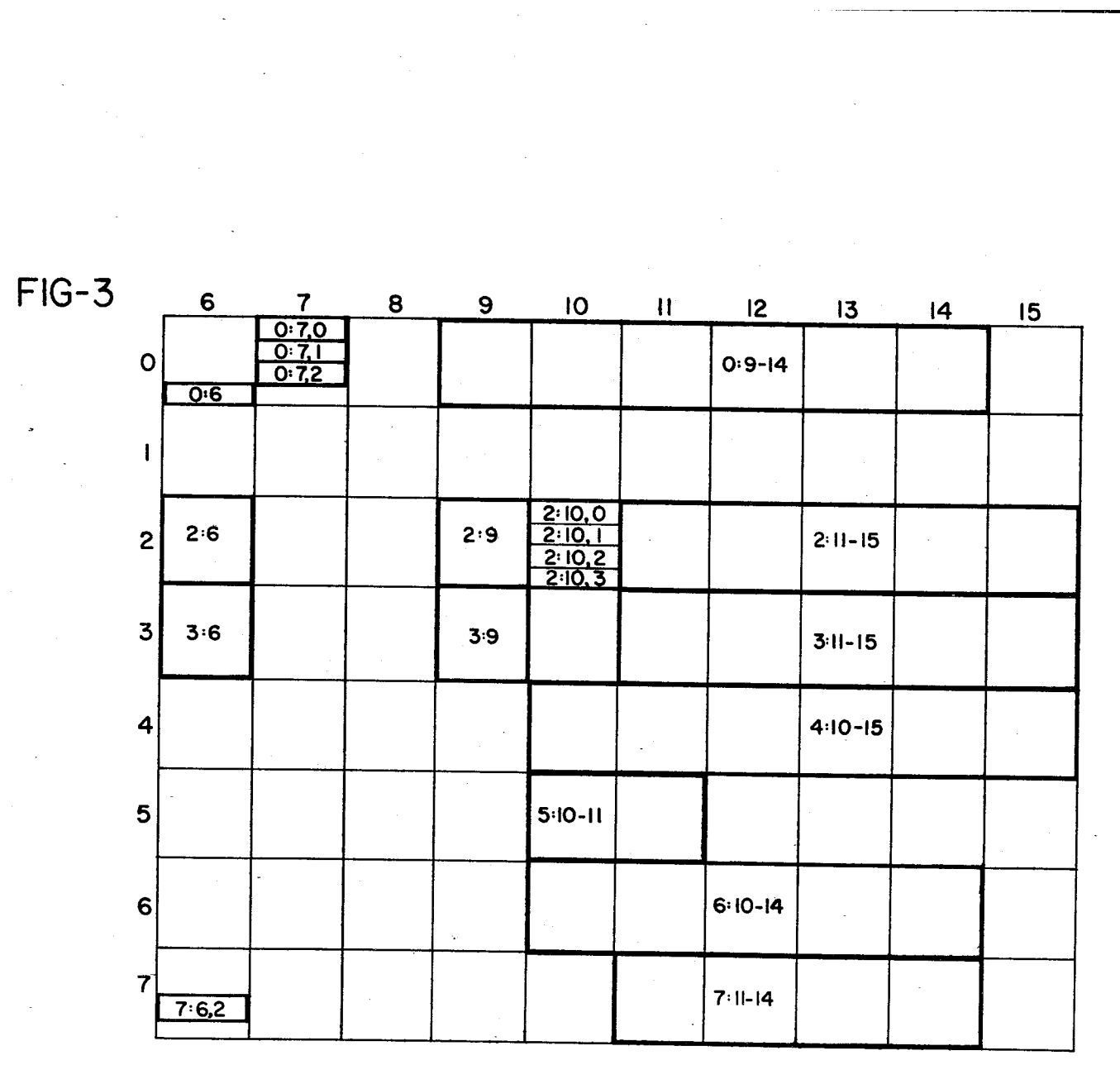

FIG. 3 is a memory map showing the locations of the components 101–123 of the scale-in-motion and weight averaging circuit 60 within the random access memory 90. Each memory component in FIG. 2 is labelled with the address of the corresponding memory location(s) in FIG. 3, in the form X:Y for a single 4-bit location, $X:Y_1-Y_2$ for a group of adjacent 4-bit locations, and X:Y,N for a single bit (bit N) within a memory location.

In analyzing the sequence of digital signals developed by the A-D converter from the filtered output voltage of the load cell, this circuitry first distinguishes between unidirectional variations (as illustrated by FIG. 4a) and oscillatory variations (as illustrated by FIG. 4b). When the signal variation is oscillatory in character, groups of successive signals are averaged and the successive averages are compared.

Each group of digital signals to be averaged consists of all the digital signals derived from one complete cycle of the oscillating analog signal (See FIG. 4b). In this way, a high degree of accuracy is achieved on the basis of a relatively small number of signals.

A determination of whether the scale is in motion or out of motion is then based on comparison of the successive averages using one of a number of possible alternative criteria which are described later.

For the purposes of this invention, one cycle is defined as the interval between two successive maxima or between two successive minima in the analog signal, as shown in FIG. 4b. For simplicity, the analog signal is represented as a simple sine wave in this figure. However, in practice, it may often be more complex than this, consisting of a number of underlying sinusoidal components of different frequencies, and thus the resultant signal waveform may not be as regular and symmetrical as that shown in FIG. 4b. Under these circumstances, a cycle is defined as the interval between successive maxima or between successive minima in the overall resultant waveform for the purposes of this invention. This is not necessarily the same as the interval between successive maxima or minima (the duration of a cycle) of any one specific sinusoidal component. If the analog signal is constant so that all of the digital signals are exactly equal to one another, as shown in FIG. 4c, each successive pair of such digital signals is treated as a cycle.

The number of digital signals to be averaged is therefore variable. It depends, for example, on the frequency of the vibration to which the scale is subjected and the time interval between successive digital signals. It therefore changes whenever either of these parameters changes. In addition, if the analog signal consists of a number of underlying sinusoidal components of different frequencies, the time interval between successive maxima or minima of the composite signal, and therefore also the number of digital signals to be included in the corresponding average, may vary from one cycle to the next.

Even when each successive cycle is of the same duration, the number of digital signals per cycle may vary by one from cycle to the next. For example, if the duration of each cycle were 4.5 times the interval between digital signals, some cycles would generate 4 digital signals and others would generate 5 digital signals.

Since the invention identifies each maximum and minimum in the signal variation individually, it is able to recognize these variations in the number of signals to be averaged, and incorporate them in the computation automatically.

In this invention, the foregoing analysis of the variation of the incoming digital signals (A,B,C, . . . etc., see FIG. 4), is accomplished in the following manner. Each time a fresh signal is received from the A-D converter, it is compared with the previous signal and labelled. If the new weight signal is larger than the previous signal, a distinctive label, for example a positive label (+) is assigned. If the new signal is smaller than the previous signal, an opposite label, for example, a negative label (−), is assigned. If the new weight signal equals the previous signal, the new label is the opposite of the previous label, (i.e., if the previous label was negative (−), then a positive label (+) is assigned to the new signal, and vice versa.) In the following description, positive and negative labels are used, but it is understood that any pair of alternative (opposite) labels may be used to obtain the same result. In the preferred embodiment of the microcomputer, the labels are actually represented by a bit (sign indicator 109) which is "set" to 1 (corresponding to a negative sign) or "reset" to 0 (corresponding to a positive sign).

The sequence of sign labels assigned to the successive readings (i.e., digital signals) is then interpreted as follows:

(a) If the scale is in continuous motion in one direction, i.e., weight readings increasing continuously or decreasing continuously (see FIG. 4a), as when weight is applied or removed, all the signs will be the same. In practice, the scale is considered to be in unidirectional motion if the number of successive signals all having the same sign label exceeds a predetermined constant C.

(b) If the signals are oscillating due to vibration, as shown in FIG. 4b, there will be groups of successive readings, each group consisting of one or more (but not more than C) readings all having the same sign label, but with the sign alternating from one group to the next (e.g. + + + − − − − + + + − − −). The number of readings in each group is determined by the frequency of the vibration and the time interval between successive signals from the A-D converter 50. Two successive groups of readings, one having a positive sign label and the other having a negative label, represent one complete cycle of oscillation, and these are the readings to be included in one average. The sign label changes from positive to negative each time a maximum value of the signals occurs, and from negative to positive each time a minimum occurs. Thus, every second change of sign represents the completion of a cycle.

(c) If the scale is completely steady, as shown in FIG. 4c, so that successive weight readings are all identical, the sign labels for successive weight signals will alternate between positive and negative (+ − + − + −). In this case each group to be averaged is selected just as in the case of an oscillating analog signal and consists of two readings, one with a positive label (+), and one with a negative label (−).

The value assigned to the constant C, together with the A-D conversion time interval t between successive digital signals, determines the cutoff frequency f, below which the microcomputer no longer considers the signal to be oscillating, i.e., f is approximately equal to $1/(2Ct)$. It also sets a limit on the speed with which the scale can respond to a change in weight. Thus, an optimum value of C can be assigned for any given application, depending on the vibration frequencies to be expected, the speed of response desired, and the conversion speed of the A-D converter. In the preferred embodiment, values of C=7 and t=20 to 40 milliseconds are used.

The incoming signals are analyzed, as described above, by the circuitry shown in FIGS. 2 and 3. The weight reading represented by the most recent signal from the A-D converter is stored in register 112. The previous weight reading is stored in register 118. The sign label assigned to the previous weight reading is recorded in register 109. The most recently-computed average of the weight signals is placed in register 111.

The previous average or target is stored in register 117. An addition register 113 accumulates the sum of the weight readings to be included in each successive average.

A full-cycle counter 104 counts the number of readings which have been received in the current cycle of oscillation. A half-cycle counter 103 counts the number of consecutive signals that have all had the same sign label.

A phase indicator 106 indicates whether the most recent signals are associated with the first or second half of a complete cycle. Unidirectional motion, when it occurs, is indicated in register 108. A "first cycle" indicator 107 is set immediately after a period of unidirectional motion to indicate that there is no previous average from a cycle of oscillatory signals with which to compare the average now being computed.

In order to analyze the sequence of sign labels, the half-cycle counter 103 is incremented by one each time a signal having the same sign label as the previous signal is received, and is set back to one each time the sign label changes. When the half-cycle count exceeds the predetermined constant C, the unidirectional motion indicator 108 is set, and remains set as long as the succeeding signals continue to have the same sign label. When this condition exists, the scale is always in motion.

When a signal having the opposite sign label is eventually received, the unidirectional motion indicator 108 is cancelled, and the first cycle indicator 107 is set. If more than C consecutive readings having the same sign are subsequently again received, the unidirectional motion indicator 108 will be reinstated. However, ordinarily, this change in sign represents the onset of oscillatory signal variation (FIG. 4b) or a constant signal (FIG. 4c). At this time, the circuit 60 begins to accumulate the data which will be needed in order to compute the average of the signals associated with the ensuing cycle of oscillation. Initially, the full-cycle counter 104 and the half-cycle counter 103 are each set to one, the phase indicator 106 is set to indicate the first half of cycle, the addition register or weight accumulator 113 is set to zero, and then the value of the new signal is entered into this register 113.

As each subsequent signal is received, it is added to the total in the addition register 113, and the full-cycle and half-cycle counters are both incremented by one. Since the sign label changes twice in each cycle of oscillation, an average is not computed at the next change in sign label. Instead, the phase indicator 106 is changed to indicate second half cycle. (The half-cycle counter 103 is always reduced to one when the sign changes.)

The next change in sign label after this represents the completion of a cycle of oscillation (or a pair of signals if the signals are all identical), and is identified by the fact that the phase indicator 106 already indicates the second half of a cycle. The average of the signals included in the cycle is then computed by dividing the contents of the addition register 113 by the contents of the full-cycle counter 104. The latest signal is not included in this average since it is actually the first reading of the next cycle.

The addition register 113 is then returned to zero, the value of the latest signal is entered in it, the full-cycle and half-cycle counters are each set to one, and the phase indicator 106 is changed back to indicate first half cycle in preparation for the next cycle of signals.

This same procedure is repeated for each successive cycle as long as the half-cycle count never exceeds the predetermined constant C. When the average of the first cycle of signals is computed, it is stored as a target in the primary target weight register 117 (both primary and secondary target registers 117 and 116 if the scale is in the special mode of operation) for future comparison, and the first-cycle indicator 107 is cancelled. As each subsequent average is computed, it is compared with the target (primary target in the normal mode of operation, both primary and secondary targets in the special mode).

In the simplest forms of the invention if the difference between the new average weight and the target is equal to or greater than a predetermined limit, the scale is in motion, and the previous target is replaced by the new average. If the difference is less than the predetermined limit, the scale is out of motion, and in this case, the target may or may not be replaced by the new average for future comparison, depending on the particular form of the motion criterion which is being used, and on whether the scale was previously in motion. More sophisticated motion criteria based entirely or predominantly on this comparison of successive averages can also be incorporated into the invention. Some examples will be described later.

The averaging procedure is discontinued and the unidirectional motion indicator is again set any time that the onset of unidirectional motion is indicated by the occurrence of a half-cycle count greater than the predetermined constant C.

In the course of the foregoing analysis, the scale-in-motion indicator 101 is set or remains set whenever the scale is found to be in motion and whenever the unidirectional motion indicator 108 is set; and the scale-in-motion indicator 101 is reset (i.e., cancelled) or remains reset whenever the scale is found to be out of motion.

Reference is now made to the flow chart in FIGS. 5a to 5h illustrates the analysis made each time a new weight signal is received from the A-D converter. The major steps performed in this analysis are also listed chronologically below.

First, the new digital weight signal is compared with the previous signal, and a sign label is assigned to the new reading in accordance with the scheme described above.

The sign label is then compared with the label already assigned to the previous weight reading and stored in register 109, which is then discarded, and replaced by the new label.

If the signs are the same, the half-cycle counter 103 is incremented by one, and checked to see if its count has exceeded the predetermined constant C.

If it has not exceeded C, the new weight reading is added to the previous total of the weight readings in the addition register 113, and the full-cycle counter 104 is incremented by one.

If the half-cycle count has exceeded C, it is only necessary to set the unidirectional motion indicator 108 and the scale-in-motion indicator 101. (If they are already set, they remain set.) It is not necessary to perform any further computation with the signals received from the A-D converter during such unidirectional motion, since they are not representative of the weight on the scale. However, if desired, the signal may be processed and displayed in any of a number of ways for cosmetic purposes.

If the sign label of the new weight signal is opposite to that of the previous signal, the half-cycle counter 103 is set back to one, and the unidirectional motion indicator 108 is checked.

If the unidirectional motion indicator 108 is set, then this change of sign represents the end of a period of unidirectional motion. The unidirectional motion indicator is therefore cancelled, and the first cycle indicator 107 is set. The addition register 113 is set back to zero, and the new weight signal is entered in it. The full-cycle counter 104 is set back to one, and the phase indicator 106 is reset to indicate the first half of a cycle.

If the unidirectional motion indicator 108 is not found to be set, then the change of sign represents the end of a half cycle of oscillatory motion. The phase indicator 106 is, therefore, checked to determine whether it is the first or second half of the cycle.

If it is the end of the first half cycle, the full-cycle counter 104 is incremented by one, the new weight signal is added to the previous total of the weight readings in the addition register 113, and the phase indicator 106 is changed to indicate second half of a cycle.

On the other hand, if the phase indicator 106 is found to already indicate second half cycle, then this change of sign represents the completion of a full cycle of oscillation. The average of the completed cycle of readings is then computed by dividing the contents of the addition register 113 by the contents of the full-cycle counter 104. (This average does not include the new weight signal, which constitutes the first reading of the next cycle). The addition register 113 is then set back to zero, and the new weight reading is entered into the addition register to become the first reading of the next cycle. The full-cycle counter is set back to one, and the phase indicator is reset to indicate the first half of a cycle.

The first-cycle indicator 107 is then checked to see if this is the first cycle of oscillatory motion following a period of unidirectional motion.

If this is a first cycle, then the scale is still in motion since there is no average from a previous cycle with which to compare the new average. The new average is, therefore, simply retained in register 117 for future comparison when another average is subsequently obtained, and the first cycle indicator 107 is cancelled in preparation for that event.

On the other hand, if this is not a first cycle (i.e., if the first-cycle indicator has already been cancelled), then the new average is compared with the previous average or with a target average.

One of a number of possible criteria, based on the difference between the new average and the previous average, or between the new average and the target, is then used to determine whether the scale is in or out of motion, and to compute the true weight if out of motion. These criteria are applied only when the scale is not in unidirectional motion, since it is always in motion (unidirectional motion) whenever the half-cycle count is greater than the critical value C.

Criterion No. 1. In the simplest form of the invention, the new average is compared with the previous average. If the difference between the two averages is equal to or greater than a predetermined limit $\Delta$, the scale is in motion; if the difference is less than $\Delta$, the scale is out of motion, and the current average represents the true weight. A suitably small value is assigned to $\Delta$ to achieve the required degree of precision in weighing. This criterion has the disadvantage that if the weight on the platter is increased gradually, motion may not be detected if the rate of increase is small enough. Even though the rate of change must be very small, a considerable total change in weight may build up over an extended period of time without motion being detected.

Criterion No. 2. The simple criterion described above can be significantly improved by comparing each successive computed average with a target instead of with the previous average. Whenever the difference between the new average and the target is equal to or greater than the predetermined limit $\Delta$, the scale is in motion, and the target is updated by installing a new target in register 117 equal to the new average. Under these circumstances, each successive average is, in effect, compared with the previous average, as in Criterion No. 1, described above.

However, if the difference is less than $\Delta$, the scale is out of motion. Under these circumstances, the target is not updated, but remains constant as long as the scale is out of motion. Its value is established when the scale changes from the in-motion condition to the out-of-motion condition, and is the first of the two averages which are compared at that time. The scale remains out of motion as long as each successive average matches this fixed target within the prescribed limit $\Delta$. It goes back into motion, and updating of the target is resumed, whenever a computed average differs from the fixed target by an amount equal to or greater than $\Delta$. When the scale is out of motion, the target is considered to represent the true weight.

This criterion has the advantage that it readily detects the motion associated with slow gradual changes in weight which were mentioned in connection with Criterion No. 1.

Criterion No. 2A. A small improvement in the accuracy of the weight computations resulting from Criterion No. 2 can be achieved by updating the target the first time that two successive averages are found to differ by an amount less than $\Delta$ after the scale has been in motion. The target still remains constant as long as the scale is out of motion, but its value is equal to the second of the two averages which are compared at the time that the scale changes from the in-motion to the out-of-motion condition, instead of the first. The target is still updated whenever a computed average differs from it by an amount equal to or greater than $\Delta$ (i.e., whenever the scale is in motion).

Criterion No. 3. Criteria Nos. 2 and 2A can be further modified to ignore a single average which differs from the target by an amount equal to or greater than $\Delta$ if the scale was out of motion immediately before the computation of that average. Thus, once the scale is out of motion, two successive averages, both differing from the target by an amount equal or or greater than $\Delta$, are required in order for the scale to get back into motion. This makes the scale less susceptible to transient disturbances of very short duration, such as may occur, for example, when there is a sudden change in the level of vibration to which the scale is exposed. (Of course, the scale always goes into motion immediately if the half-cycle count exceeds the critical value C.)

Criterion No. 4. Any of the foregoing criteria can be further modified to require that a number of successive averages must all match the target within the prescribed limit $\Delta$ in order for the scale to go out of motion after being in motion. This can be accomplished, for example, by including a matching-average counter 102 in the memory 60. This counter is set back to zero whenever an average is found to differ from the target by an amount equal to or greater than $\Delta$ (except when the average is being ignored as described under Criterion No. 3), and is incremented by one whenever the difference is found to be less than $\Delta$. The scale is then considered to be out of motion when the number in this counter equals or exceeds the required number of matching averages. It is considered to be still in motion as long as this matching-average count is less than the required number, even though the currently-computed average may match the target within the required limit.

The purpose of this modification is to provide some protection against "thumbweighing" (i.e., incorrect weighing caused by the operator touching the platter with his hand). However, it makes the operation of the scale significantly slower.

Criterion No. 5. In certain special situations, there may be reasons for knowing that the first few cycles of oscillation after the end of unidirectional motion are not an accurate representation of the weight on the scale. For example, if a large weight near the capacity limit of the scale is slammed down hard on the scale, it may cause the moving parts to bounce against a stop during the initial oscillations. Alternatively, it may cause the load cell to operate intermittently in an overload condition where its output is non-linear during the first few cycles of oscillation. Under these conditions, the scale might occasionally go out of motion with an incorrect weight reading.

This problem can be counteracted by not permitting the scale to go out of motion until a certain number of cycles of oscillation, or a certain length of time, after the end of unidirectional motion if the weight signals exceed a specified magnitude $W_c$. Thus, an A-D reading counter 119 or a timer is started at the moment of transition from unidirectional motion to oscillatory signal variation. Each time an average is subsequently found to match the target within the prescribed limit, the magnitude of the average is compared with $W_c$. If it is less than $W_c$, the scale is out of motion. If it is greater than $W_c$, the cycle counter or timer is checked. If the specified time has elapsed or the required number of cycles of oscillation have occurred, the scale is again out of motion. Otherwise it is still in motion. This significantly reduces the weighing speed for weights greater than $W_c$, but does not affect the weighing speed for weights less than $W_c$.

Criterion No. 6. Any of the foregoing criteria can be modified by prescribing alternative limits, $\Delta_1$ or $\Delta_2$, depending on whether the scale was previously in motion or out of motion. Thus, if the scale is initially in motion, it is considered to go out of motion when two successive averages differ by an amount less than $\Delta_1$. In the case of Criterion No. 4, the scale would be considered to go out of motion when the required number of successive averages all differ from the target by an amount less than $\Delta_1$. If the scale is out of motion, it will go back into motion when any average (two successive averages in the case of Criterion No. 3) differs from the target by an amount equal to or greater than $\Delta_2$. It remains out of motion as long as the difference is less than $\Delta_2$.

This modification, with $\Delta_2$ greater than $\Delta_1$, may be useful in certain circumstances; for example, when the scale is subject to intermittent mild shocks, which might otherwise cause the scale to go back into motion intermittently under a constant weight.

Criterion No. 7. Any of the foregoing criteria can be modified by imposing an additional requirement that the scale cannot be considered to be out of motion if the amplitude of the oscillations (i.e., the difference between the largest and the smallest reading within a cycle of readings) or the difference between any two successive readings exceeds a certain limit L (which can be many times greater than $\Delta$).

This modification is related to a special situation where the platter is supported on the scale through a flexible structure which can execute violent and irregular oscillations at low frequencies when a heavy weight is slammed down hard on it, and a fast analog filter (i.e., one with relatively high cut-off frequency) is used. It is intended to prevent incorrect weight readings which might otherwise occasionally occur in this special situation. The acceptable limit L for the difference between the largest and smallest signal within a cycle or between successive signals can be set large enough so that this modification does not have any effect on the operation of the scale in normal circumstances.

The preferred embodiment of this invention uses a TMS 1300 MOS/LSI one-chip microcomputer made by Texas Instruments, Inc. A listing of the portion of the program used in this microcomputer to accomplish the objectives of this invention follows. This listing includes both the object code and the source code, together with explanatory comments. This program is stored in the ROM (read only memory) 70. The pages of program are not necessarily executed in numerical order. In the present instance, the execution begins at Chapter 1, page 15, line 2153, and subsequently continues on other pages as indicated by specific branch instructions. It ends at Chapter 1, page 6, line 1433.

```
PAD OBJ STMT              SOURCE STATEMENT

1007    *
        1008    *
        1009    *
        1010    *
        1011    *
        1012    *
        1013    *
        1014    *   SCALE IN MOTION ROUTINE (CONTINUED FROM CH 1, P15)
        1015    *
        1016    *
        1017    *   THE SIGN LABEL IS POSITIVE (THE RESULT OF THE SUBTRACTION
        1018    *   IS NEGATIVE). THE COMPLEMENT OF THE DIFFERENCE BETWEEN
        1019    *   SUCCESSIVE A-D READINGS IS M(7,11-14). TEST WHETHER THE
        1020    *   DIFFERENCE IS LESS THAN 16 - M(7,12-14) = FFF - OR LESS
        1021    *   THAN 32 - M(7,12-14) = EFF.
        1022    *
00 3E   1023    POSCHG   IMAC           IF MSD - M(7,14) - IS AN F, BRANCH TO TES
01 87   1024             BR POSCHG1     THE SECOND DIGIT. OTHERWISE THE SCALE IS
03 9E   1025             BR MTN1        MOTION (EXCESSIVE OSCILLATION AMPLITUDE).
        1026    *
07 4B   1027    POSCHG1  TCY 13
0F 3E   1028             IMAC           IF 2ND DIGIT - M(7,13) - IS AN F, BRANCH
1F BE   1029             BR POSCHG2     TEST 3RD DIGIT. OTHERWISE THE SCALE IS I
3F 9E   1030             BR MTN1        MOTION (EXCESSIVE OSCILLATION AMPLITUDE).
        1031    *
3E 43   1032    POSCHG2  TCY 12         IF 3RD DIGIT - M(7,12) - IS AN F, THE SCA
3D 3E   1033             IMAC           IS NOT SUBJECT TO EXCESSIVE OSCILLATION.
3B AB   1034             BR POSITIVE    BRANCH TO POSITIVE.
37 70   1035             IAC            IF IT IS AN E, BRANCH TO MOTION5 TO TEST
2F A7   1036             BR MOTION5     WHETHER MSD OF A-D RDG, M(2,14) = 0.
        1037    *
        1038    *   THE 3RD DIGIT OF DIFFERENCE IS NOT AN E OR AN F. THEREFORE T
        1039    *   SCALE IS IN MOTION DUE TO EXCESSIVE OSCILLATION AMPLITUDE.
        1040    *
1E 2A   1041    MTN1     LDX 2
3C 45   1042             TCY 10
39 37   1043             RBIT 3         MAKE SIGN LABEL POSITIVE.
33 9C   1044             BR OVFLW       GO TO SET MOTION & UNIDIRECTIONAL FLAGS.
        1045    *
27 2A   1046    MOTION5  LDX 2
0E 47   1047             TCY 14
1D 3F   1048             MNEZ           IF MSD OF A-D RDG, M(2,14), IS NOT ZERO,
3A AB   1049             BR POSITIVE    SCALE IS OUT OF MOTION. BRANCH TO POSITIV
35 9E   1050             BR MTN1        IF IT IS ZERO, THE SCALE IS IN MOTION DUE
        1051    *                       TO EXCESSIVE OSCILLATION AMPLITUDE.
2B 45   1052    POSITIVE TCY 10         SIGN OF THE DIFFERENCE IS POSITIVE.
16 2A   1053             LDX 2
2C 3B   1054             TBIT1 3        TEST PREVIOUS DIFFERENCE.
18 A2   1055             BR COMPSIGN    REVERSE SIGN IF PREVIOUS SIGN WAS NEGATIVE.
30 39   1056    SAMESIGN TBIT1 2        PRESENT SIGN SAME AS PREVIOUS SIGN.
21 9C   1057             BR OVFLW       IF ALREADY IN UNIDIRECTNL MOTION, BRANCH
02 49   1058             TCY 9
05 07   1059             DMAN           DECREMENT THE HALF-CYCLE COUNTER.
0B 25   1060             TAMIYC
17 76   1061             A7AAC     ARE THERE 7 OR FEWER RDGS IN HALF CYCLE?
2E 90   1062             BR INCRADCT    IF YES, DO NOT AVERAGE.
1C 1E   1063    OVFLW    BL OVERFLOW
38 BB   1063
        1064    *
        1065    *
        1066    *
        1067    *   THE SIGN LABEL IS NEGATIVE. THE RESULT OF SUBTRACTING THE PR
        1068    *   A-D READING FROM THE PREVIOUS READING IS POSITIVE. THE FIRST
        1069    *   DIGITS OF THE DIFFERENCE ARE ZERO. THE THIRD DIGIT IS NOT ZE
        1070    *
31 77   1071    NEGCHG2  DAN            IF NO BORROW, 3RD DIGIT IS > 1. SCALE IS I
```

```
                                  4,379,495
23  AD  1072              BR MTN         MOTION. BRANCH TO MTN.
        1073    *
        1074    *  THE 3RD DIGIT IS 1
        1075    *
06  2A  1076              LDX 2
0D  47  1077              TCY 14       TEST MSD OF A-D RDG, M(2,14). IF NOT EQUA
1B  3F  1078              MNEZ         TO ZERO, THE SCALE IS OUT OF MOTION. BRANC
36  92  1079              BR NEGATIVE  TO NEGATIVE.
        1080    *
        1081    *  MSD OF A-D RDG IS ZERO. THE SCALE IS IN MOTION DUE TO EXCESS
        1082    *  OSCILLATION AMPLITUDE.
        1083    *
2D  2A  1084    MTN       LDX 2
1A  45  1085              TCY 10
34  33  1086              SBIT 3       MAKE THE SIGN LABEL NEGATIVE.
29  9C  1087              BR OVFLW
        1088    *
12  2A  1089    NEGATIVE  LDX 2
24  45  1090              TCY 10       SIGN LABEL IS NEGATIVE
08  3B  1091              TBIT1 3      TEST PREVIOUS SIGN
11  B0  1092              BR SAMESIGN  BRANCH IF ALSO NEGATIVE.
22  2A  1093    COMPSIGN  LDX 2
04  45  1094              TCY 10
09  21  1095              TMA
13  7E  1096              ASAAC        REVERSE THE SIGN FLAG.
26  27  1097              TAM
0C  1B  1098              LDP 13
19  39  1099              TBIT1 2      TEST THE UNIDIRECTNL MOTION FLAG.
32  BD  1100              BR OVRFLOW1  BR IF SET.
25  38  1101              TBIT1 0      TEST THE PHASE FLAG.
0A  80  1102              BR MOV2CK    BRANCH TO COMPUTE AVERAGE IF FULL CYCLE.
        1103    *
        1104    * FULL CYCLE CONSISTS OF ONE GROUP OF CONSECUTIVE READINGS
        1105    * ASSOCIATED WITH POSITIVE DIFFERENCES AND ONE GROUP ASSOCIATED
        1106    * WITH NEGATIVE DIFFERENCES, WITH AT LEAST ONE BUT NOT MORE
        1107    * THAN SEVEN READINGS IN EACH GROUP.
        1108    *
15  30  1109              SBIT 0       SET PHASE FLAG TO INDICATE 2ND HALF CYCLE.
2A  49  1110    SETCTR    TCY 9
14  2A  1111              LDX 2
28  6F  1112              TCMIY 15     SET HALF-CYCLE COUNTER TO 15 (TO BE
        1113    *                      DECREMENTED AT EACH A-D READING UNTIL
        1114    *                      THE SIGN OF THE DIFFERENCE CHANGES OR
        1115    *                      AN AVERAGE OF 8 READINGS IS COMPUTED).
10  16  1116    INCRADCT  BL INCADCT
20  80  1116
        1117    *
        1118    *
        1119    *
        1120    *
        1121    *
        1122    *
        1123    *
        1124              PAGE    1216       PAGE 3 CHAPTER 1
        1125    *
        1126    *
        1127    *        SCALE IN MOTION ROUTINE (CONTINUED)
        1128    *
00  4B  1129    DIGIT2    TCY 13       IF THE 2ND DIGIT OF THE AVGE A-D INPUT 12
01  21  1130              TMA          OR GREATER (I.E., IF A-D INPUT > 11,263
03  7C  1131              A4AAC        COUNTS) & NO OF A-D RDGS SINCE END OF UNI-
07  99  1132              BR MOTION3   DIRECTIONAL MTN < 14, SCALE IS STILL IN MTN.
0F  45  1133    MOV17     TCY 10
1F  19  1134              CALLL MOV17A SUBTRACT PRESENT AVERAGE FROM PREVIOUS
3F  C0  1134
        1135    *                      AVERAGE. PLACE DIFFERENCE IN M(4,10-14).
3E  47  1136    CHANGE0   TCY 14       TEST THE DIFFERENCE.
3D  3F  1137    CHANGE    MNEZ         ARE THE FIRST 3 DIGITS ZEROS?
3B  A5  1138              BR PRTMTN1   NO, BR TO INSERT CODE 5 (ACTIVATE PRINTER)
37  04  1139              DYN
2F  5D  1140              YNEC 11
1E  BD  1141              BR CHANGE
3C  07  1142              DMAN         IS THE FOURTH DIGIT ZERO?
39  AC  1143              BR ISIT3     IF NOT, GO TO TEST WHETHER IT IS > 2.
33  2E  1144    STABLE    LDX 3        IF LAST TWO DIGITS < 1.8, SCALE
```

```
27  1E  1145            LDP 7
0E  46  1146            TCY 6       IS OUT OF MOTION.
1D  6F  1147            TCMIY 15    INSERT STATE CODE 15 IN M(3,6). THIS MEAN
        1148    *                   OUT OF MOTION AT A NON-ZERO WEIGHT. IT WI
        1149    *                   BE CHANGED TO A 1 (IN WLT6), 2 (IN NOSIGN
        1150    *                   3 (IN DWD), 4 (IN ZEROL7), OR 7 (IN CODE7
        1151    *                   IF APPROPRIATE.
3A  28  1152            LDX 0
35  38  1153            TBIT1 0     WAS THE SCALE PREVIOUSLY IN MOTION?
2B  A7  1154            BR ENDMTN   IF YES, UPDATE THE TARGET AND DISPLAY.
16  A9  1155            BR CLEAR2   IF NO, KEEP SAME TARGET & DO NOT DISPLAY AGAIN
        1156    *
        1157    *
        1158    *
2C  72  1159    ISIT3   A5AAC       IS THE DIFFERENCE IN THE 4TH DIGIT > 11?
18  A5  1160            BR PRTMTN1  YES, BR TO INSERT CODE 5 (ACTIVATE PRINTER
30  7E  1161            A8AAC       IS DIFFERENCE IN 4TH DIGIT > 3?
21  99  1162            BR MOTION3  YES, BRANCH (SCALE IS IN MOTION).
02  78  1163            A2AAC       IS THE DIFFERENCE IN THE 4TH DIGIT ONE?
05  B8  1164            BR MOTION2  IF NOT, BRANCH
0B  45  1165            TCY 10
17  3B  1166            TBIT1 3     IF SO, IS DIFF. IN 5TH DIGIT > 8
2E  B8  1167            BR MOTION2  IF SO, BRANCH.
1C  B3  1168            BR STABLE   IF NOT, THE SCALE IS OUT OF MOTION.
        1169    *
38  2F  1170    MOTION2 LDX 7       IF SWITCH 6 IS ON FOR MANUAL OPERATION, THE
31  46  1171            TCY 6       SCALE IS IN MOTION. IF SWITCH 6 IS OFF FOR
23  39  1172            TBIT1 2     ILA OPERATION THE STATE OF THE SCALE IS
06  9B  1173            BR NEUTRAL  UNCHANGED FOR 1.7 < DIFF BETWEEN AVGES < 3
0D  99  1174            BR MOTION3  (I.E., STILL IN MOTION IF PREVIOUSLY IN MTN,
        1175    *                  OUT OF MOTION IF PREVIOUSLY OUT OF MOTION).
        1176    *
1B  4E  1177    NEUTRAL TCY 7
36  28  1178            LDX 0
2D  1E  1179            LDP 7
1A  38  1180            TBIT1 0
34  A1  1181            BR MOTION       UPDATE THE TARGET IF THE SCALE IS IN MOTI
        1182    *
        1183    * THE SCALE IS SWITCHED TO "ILA OPERATION" & IS NOT IN MOTION.
        1184    * IN THIS CONDITION THE PRIMARY TARGET IN M(6,10-14) IS STILL
        1185    * UPDATED WHENEVER A COMPUTED AVERAGE WEIGHT DEVIATES FROM IT
        1186    * BY 1.8 COUNTS OR MORE, BUT THE SCALE IN MOTION FLAG IS NOT
        1187    * SET & THE SECONDARY TARGET IS NOT UPDATED UNTIL AN AVERAGE
        1188    * DEVIATES FROM IT BY MORE THAN -4.0 OR +3.F COUNTS. THEREFORE,
        1189    * AT THIS POINT, COMPARE THE NEW AVERAGE WITH THE SECONDARY
        1190    * TARGET, WHOSE TWO LEAST SIGNIFICANT DIGITS ARE IN M(5,10-11).
        1191    *
29  45  1192            TCY 10
12  2D  1193            LDX 5
24  21  1194            TMA         IS THE LEAST SIGNIFICANT DIGIT OF THE SECONDA
08  28  1195            LDX 0       TARGET IN M(5,10) GREATER THAN THE LEAST
11  3C  1196            SAMAN       SIGNIFICANT DIGIT OF THE NEW AVERAGE IN
22  80  1197            BR NBR      M(0,10)? NO, BRANCH.
04  2D  1198            LDX 5
09  4D  1199            TCY 11      TRANSFER THE SECOND DIGIT OF THE SECONDARY
13  21  1200            TMA         TARGET FROM M(5,11) TO THE ACCUMULATOR.
26  87  1201            BR DIFF
        1202    *
        1203    *
0C  36  1204    OVRFLOW2 RBIT 1     RESET FIRST CYCLE FLAG.
19  1E  1205    MOTION3  BL MOTION
32  A1  1205
        1206    *
25  1E  1207    PRTMTN1  BL PRTMTN
0A  BC  1207
        1208    *
        1209    *
        1210    *
        1211    *
        1212            PAGE    1408        P.6 CHAPTER 1
        1383    *
        1384    *
        1385    *
        1386    *
        1387    *   CHECK FOR A-D INPUT GREATER THAN 6144 COUNTS.
        1388    *
```

```
00  46  1389  INCADCT  TCY 6       INCREMENT THE A-D RDG COUNTER. THIS IS SET
01  3E  1390           IMAC        BACK TO 2 IN OVERFLOW1 AT THE END OF UNI-
03  8F  1391           BR FILTER   DIRECTIONAL MOTION & TESTED BELOW MOV14 TO
07  27  1392           TAM         SEE IF IT HAS REACHED 15 BEFORE TESTING FOR
        1393  *                    OUT OF MOTION IF A-D AVERAGE > 11,264 COUNT
0F  47  1394  FILTER   TCY 14
1F  21  1395           TMA         MSD OF A-D READING = 0 OR 1?
3F  7B  1396           A14AAC
3E  8C  1397           BR MSDONE   NO, BRANCH.
3D  40  1398  LOFILT   TCY 0       A-D READING IS LESS THAN 9216 COUNTS.
3B  0C  1399           RSTR
37  4D  1400  BINADD0  TCY 11
2F  7F  1401           CLA
1E  2A  1402  BINADD   LDX 2       ADD PRESENT A-D READING TO THE SUM OF THE
3C  06  1403           AMAAC       PREVIOUS A-D READINGS.
39  B5  1404           BR CARRY1
33  2E  1405           LDX 3
27  06  1406           AMAAC
0E  96  1407           BR CARRY2
1D  26  1408           TAMZA
3A  98  1409           BR NEXTDIG
        1410  *
35  2E  1411  CARRY1   LDX 3
2B  06  1412           AMAAC
16  26  1413  CARRY2   TAMZA
2C  70  1414           IAC
18  05  1415  NEXTDIG  IYC
30  50  1416           YNEC 0
21  9E  1417           BR BINADD
02  49  1418  DECR     TCY 9
05  07  1419           DMAN        DECREMENT THE FULL-CYCLE COUNTER AT EACH
        1420  *                    READING UNTIL AN AVERAGE IS COMPUTED.
0B  25  1421           TAMIYC
17  47  1422  STRTTC   TCY 14
        1423  *
        1424  * MOVE LAST WEIGHT TO PRESENT MEMORY
        1425  *
2E  2B  1426  BEGI     LDX 6
1C  21  1427           TMA
38  04  1428           DYN         MOVE LATEST AVERAGE WEIGHT FROM M(6,10-14) TO
31  28  1429           LDX 0       M(0,9-13), AND ROUND TO FOUR FIGURES,
23  27  1430           TAM         M(0,10-13).
06  59  1431           YNEC 9
0D  AE  1432           BR BEGI     LAST?NO,BR
1B  19  1433           CALLL ROUND ROUND WT TO 4 FIGURES
36  CC  1433
        1434  *
        1435  *    CHECK FOR DIAGNOSTIC MODE
        1436  *
2D  46  1437  DIAGZ    TCY 6
1A  15  1438           LDP 10
34  39  1439           TBIT1 2
29  80  1440           BR AUTOZ    DIAGNOSTIC MODE?NO,BR
12  4A  1441           TCY 5
24  3B  1442           TBIT1 3     RAW A-D READINGS CALLED FOR?
08  94  1443           BR TARE44   NO, BRANCH.
11  4E  1444           TCY 7
22  36  1445           RBIT 1      SET DISPLAY UPDATE FLAG.
04  2E  1446           LDX 3
09  46  1447           TCY 6       INSERT STATE CODE 15 TO ENSURE DISPLAY OF
13  6F  1448           TCMIY 15    5-DIGIT A-D COUNT (I.E., NOT STATE CODE).
26  A6  1449           BR MOV02
        1450  *
0C  77  1451  MSDONE   DAN         MSD OF A-D READING = 2?
19  A8  1452           BR HIFILT   NO, BRANCH.
32  4B  1453           TCY 13
25  3B  1454           TBIT1 3     NEXT DIGIT 8 OR GREATER?
0A  A8  1455           BR HIFILT   YES BRANCH
15  39  1456           TBIT1 2      4 OR GREATER?
2A  B7  1457           BR BINADD0
14  BD  1458           BR LOFILT
        1459  *
28  40  1460  HIFILT   TCY 0       A-D READING IS GREATER THAN 7168 COUNTS.
10  0D  1461           SETR        SET R0.
```

```
20  B7  1462              BR BINADDO
        1463   *
        1464   *
        1465   *
        1466   *
        1467           PAGE  1664        C.1 P.10
        1468   *
        1469   *
        1470   *
        1471   *    SCALE IN MOTION (CONTINUED)
        1472   *
00  2D  1473   NBR      LDX 5
01  4D  1474            TCY 11           IF NOT, DECREMENT THE SECOND LEAST SIGNIFICAN
03  07  1475            DMAN             DIGIT IN TRANSFERRING IT FROM M(5,11) TO ACC.
07  28  1476   DIFF     LDX 0            SUBTRACT THE SECOND DIGIT OR THE SECOND DIGIT
0F  3C  1477            SAMAN            +1 FROM THE SECOND DIGIT OF THE NEW AVERAGE.
1F  74  1478            A3AAC            IS THE SECOND DIGIT OF THE DIFFERENCE BETWEEN
3F  7E  1479            A8AAC            C (-4) & +3 (INCLUSIVE).
3E  A1  1480            BR MOTION        IF NOT, THE SCALE IS IN MOTION.
3D  86  1481            BR MOV15         OTHERWISE, THE SCALE IS NOT IN MOTION. HOWEVE
        1482   *                         UPDATE THE PRIMARY TARGET. THE FACT THAT THE
        1483   *                         NEW AVERAGE IS WITHIN 4 COUNTS OF THE PRIMARY
        1484   *                         TARGET GUARANTEES THAT IT DOES NOT DEVIATE FR
        1485   *                         THE SECONDARY TARGET BY MORE THAN 8 COUNTS
        1486   *                         (SEE TEST IN SUBROUTINE "ISIT3"). CONSEQUENTL
        1487   *                         IT IS NOT NECESSARY TO COMPARE ANY DIGITS OF
        1488   *                         THE SECONDARY TARGET HIGHER THAN THE SECOND.
        1489   *
        1490   *
3B  31  1491   OVERFLOW SBIT 2       IF NO, SET OVERFLOW (THIS CYCLE)FLAG.
        1492   *
        1493   * THIS WILL PREVENT THE SCALE FROM GOING OUT OF MOTION UNTIL
        1494   * TWO SUBSEQUENT FULL CYCLES WITHOUT OVERFLOW HAVE BEEN AVERAGED
        1495   * (SEE MOV14, OVRFLOW1, AND OVRFLOW2 SUBROUTINES).
        1496   *
        1497   *
37  E1  1498            CALL MOTION
2F  6A  1499            TCMIY 5          INSERT STATE CODE 5 (ACTIVATE PRINTER).
1E  A9  1500            BR CLEAR2
        1501   *
3C  E1  1502   PRTMTN   CALL MOTION
39  6A  1503            TCMIY 5          INSERT STATE CODE 5 (ACTIVATE PRINTER).
33  86  1504            BR MOV15
        1505   *
27  34  1506   ENDMTN   RBIT 0           RESET MOTION FLAG.
0E  36  1507            RBIT 1           SET DISPLAY UPDATE FLAG
1D  4D  1508   MOV00    TCY 11           MOVE THE TWO LEAST SIGNIFICANT DIGITS OF
3A  28  1509   MOV01    LDX 0            THE LATEST AVERAGE WEIGHT FROM M(0,10-11)
35  21  1510            TMA              M(5,10-11) TO BECOME THE SECONDARY TARGET.
2B  2D  1511            LDX 5            THE PRIMARY TARGET IN M(6,10-14) IS ALWAYS
16  24  1512            TAMDYN           UPDATED WHENEVER AN AVERAGE DEVIATES FROM I
2C  59  1513            YNEC 9           BY 1.8 COUNTS OR MORE, BUT IF THE SCALE IS
18  BA  1514            BR MOV01         SWITCHED TO ILA MODE, THE MOTION FLAG WILL
        1515   *                         NOT BE SET & THE SECONDARY TARGET WILL NOT
        1516   *                         BE UPDATED UNTIL AN AVERAGE DEVIATES FROM
        1517   *                         IT BY MORE THAN -4.0 OR +3.F COUNTS.
30  86  1518            BR MOV15
        1519   *
21  28  1520   MOTION   LDX 0
02  4E  1521            TCY 7
05  38  1522            TBIT1 0
0B  9C  1523            BR MOTION1
17  36  1524            RBIT 1
2E  30  1525            SBIT 0
1C  2E  1526   MOTION1  LDX 3
38  46  1527            TCY 6
31  0F  1528            RETN             INSERT STATE CODE 0 (SCALE IN
23  60  1529            TCMIY 0          MOTION) IN M(3,6).
06  4F  1530   MOV15    TCY 15
0D  28  1531   MOV16    LDX 0            MOVE AVERAGE (INCLUDING A LEADING ZERO)
1B  21  1532            TMA              FROM M(0,10-15) TO M(6,10-15).
36  2B  1533            LDX 6
2D  24  1534            TAMDYN
1A  59  1535            YNEC 9
34  8D  1536            BR MOV16
        1537   *
```

```
29  2E  1538   CLEAR2   LDX 3
12  49  1539   CLEAR1   TCY 9
24  60  1540   CLEAR    TCMIY 0    RESET THE FULL CYCLE COUNTER & SUM OF
        1541   *                   A/D READINGS IN M(3,9-15) TO ZERO
08  50  1542            YNEC 0
11  A4  1543            BR CLEAR
22  18  1544            BL SETCTR  GO TO SET HALF-CYCLE COUNTER TO 15, DECREMEN
04  AA  1544
        1545   *                   THE FULL CYCLE COUNTER, AND ENTER FIRST
        1546   *                   WEIGHT READING INTO ACCUMULATOR, M(3,11-15)
        1547   *                   FOR THE NEXT CYCLE.
        1548   *
        1549   *
        1550   *
        1551            PAGE    1728    C.1 P.11
        1658   *
        1659   *
        1660   *
        1661   *
        1662   *
        1663   *
00  2B  1664   MOV17A   LDX 6      MOVE PREVIOUS AVERAGE, INCLUDING LEADING
01  21  1665            TMA        ZERO, FROM M(6,10-15) TO M(4,10-15).
03  29  1666            LDX 4
07  25  1667            TAMIYC
0F  50  1668            YNEC 0
1F  80  1669            BR MOV17A
        1670   *
        1671   * BINARY SUBTRACT
        1672   *
        1673   *
        1674   *
        1675   *                   MEM(0-12,13,14,15) -MEM (4-12,13,14,15)
3F  45  1676   SUBTO    TCY 10
3E  7F  1677            CLA
3D  09  1678   SI       COMX
3B  06  1679            AMAAC      BORROW
37  AC  1680            BR SBH15
2F  09  1681            COMX
1E  3C  1682            SAMAN
3C  B0  1683            BR NOBOR
39  26  1684            TAMZA
33  70  1685   BOR      IAC
27  05  1686   INCYS    IYC
0E  50  1687            YNEC 0
1D  BD  1688            BR SI
3A  77  1689            DAN
35  82  1690            BR COMP3
2B  41  1691            TCY 8   POSITIVE DIFFERENCE
        1692   *NOTE:TCY 7 IN ROUND6.THIS MAKES Y=7 AT EXIT FROM CALLED SUBROUTI
        1693   *SUBTO IF THE DIFFERENCE IS NEGATIVE,BUT Y=8 IF POSITIVE.THUS,SBI
        1694   *3 FOLLOWING CALLL SUBTO IN MOV22(CHP1,PG10)SETS THE MINUS FLAG,
        1695   *M(0,7,3)IF THE DIFFERENCE IS NEGATIVE,BUT IS WASTED ON M(0,8,3),
        1696   *A TEMPORARY STORAGE LOCATION,IF THE DIFFERENCE IS POSITIVE.
        1697   *
16  A9  1698            BR ROUND3
        1699   *
2C  09  1700   SBH15    COMX
18  B3  1701            BR BOR
        1702   *
30  26  1703   NOBOR    TAMZA
21  A7  1704            BR INCYS
        1705   *
        1706   *
        1707   *        BINARY COMPLEMENT X, Y=8,9,10,11  OR Y=12,13,14,15
        1708   *
02  45  1709   COMP3    TCY 10
05  21  1710   COMPDIG  TMA
0B  3D  1711            CPAIZ
17  77  1712            DAN
2E  25  1713   SKPDEC   TAMIYC
1C  B1  1714            BR ROUND5       LAST?YES,BR
38  85  1715            BR COMPDIG      LAST?NO,BR
        1716   *
        1717   *
```

```
              1718   *
              1719   * ROUND PRESENT WT...(ADD 1)
              1720   *
31   45       1721   ROUND5   TCY 10
23   3E       1722   ROUND1   IMAC
06   B6       1723            BR ROUND2      CARRY? YES,BR
0D   27       1724   ROUND4   TAM
1B   B4       1725            BR ROUND6      NO CARRY... GO TO EXIT
36   25       1726   ROUND2   TAMIYC
2D   B4       1727            BR ROUND6      LAST? YES,BR
1A   A3       1728            BR ROUND1      GO TO NEXT
34   4E       1729   ROUND6   TCY 7    NEGATIVE DIFFERENCE IF FROM SUBTO
              1730   *
29   0F       1731   ROUND3   RETN    EXIT
              1732   *
              1733   *
              1734   *
12   60       1735   T512A    TCMIY 0
24   47       1736            TCY 14   UPDATE REF ZERO BY MOVNG S.I.M.
08   2B       1737   MOV11    LDX 6    TARGET WEIGHT TO ZERO LOCATION
11   21       1738            TMA      M(6,10-14)->M(1,9-13)
22   2C       1739            LDX 1
04   04       1740            DYN
09   27       1741            TAM
13   59       1742            YNEC 9
26   88       1743            BR MOV11
0C   66       1744   ROUND    TCMIY 6    INSERT 6 IN M(0,9) FOR DIVIDE BY 10 IN BINB
19   7E       1745            ASAAC     IS HEXADECIMAL FRACTION 1/2 OR GREATER?
32   A3       1746            BR ROUND1  IF SO, ADD 1 TO FOUR-FIGURE WEIGHT.
25   A9       1747            BR ROUND3  IF NOT, EXIT.
              1748   *
              1749   *
              1750   *
              1751   *
              1752   *
              1753           PAGE    1920      C.1 P.14
              1991   *
              1992   *
              1993   *
              1994   *
              1995   *           SCALE IN MOTION (CONTINUED)
              1996   *
00   34       1997   MOV2CK   RBIT 0    RESET PHASE FLAG TO 1ST HALF CYCLE.
01   28       1998            LDX 0
03   4E       1999            TCY 7     DID THE LOGIC GO THROUGH MOV2 AFTER
07   39       2000            TBIT1 2   COMPUTING THE PREVIOUS AVERAGE?
0F   B9       2001            BR DIVIDE IF NO, GO TO COMPUTE AVGE OF THIS CYCLE.
1F   31       2002            SBIT 2    IF YES, SET MOV2 FLAG AND DISCARD THIS
3F   1E       2003   CLEAR3   BL CLEAR2 CYCLE OF A-D READINGS.
3E   A9       2003
              2004   *
3D   35       2005   OVRFLOW1 RBIT 2    RESET OVERFLOW IN THIS CYCLE FLAG.
3B   32       2006            SBIT 1    SET OVERFLOW IN PREVIOUS CYCLE FLAG.
37   34       2007            RBIT 0
2F   46       2008            TCY 6     SET A-D RDG COUNTER BACK TO 2. SEE EXPLANATI
1E   64       2009            TCMIY 2   IN SETCTR ABOVE.
3C   BF       2010            BR CLEAR3
              2011   *
              2012   *
              2013   *   DIVIDE BY NUMBER OF A-D READINGS IN VIBRATION CYCLE
              2014   *              (STORED IN M(3,9))
              2015   *
39   45       2016   DIVIDE   TCY 10
33   60       2017   DIVIDE1  TCMIY 0
27   50       2018            YNEC 0
0E   B3       2019            BR DIVIDE1
1D   4F       2020            TCY 15
3A   2E       2021   CONV1    LDX 3
35   23       2022   CONV2    TYA
2B   41       2023            TCY 8
16   25       2024            TAMIYC    STORE Y IN M(X,8)
2C   21       2025            TMA       RETRIEVE COMPLEMENT OF DIVISOR FROM M(X,9)
18   41       2026            TCY 8
30   22       2027            TMY       RETRIEVE THE VALUE OF Y FROM M(X,8)
21   06       2028            AMAAC     SUBTRACT THE DIVISOR FROM M(X,Y)
```

```
02  95  2029            BR GR10
05  05  2030            IYC
0B  9C  2031            BR GR15
17  3F  2032            MNEZ
2E  99  2033            BR BORROW
1C  04  2034    GR15    DYN
38  04  2035            DYN
31  59  2036            YNEC 9
23  B5  2037            BR CONV2
        2038    *
        2039    *AVERAGE FOR THE CYCLE IS NOW IN M(0,10-14).
        2040    *
06  14  2041            LDP 2
0D  2A  2042            LDX 2
1B  4A  2043            TCY 5
36  33  2044            SBIT 3      RESET TIME SLOT AVAILABLE (COMM).
2D  45  2045            TCY 10
1A  3A  2046            TBIT1 1     TEST FIRST CYCLE FLAG.
34  8C  2047            BR OVRFLOW2 BR IF FLAG SET.
        2048    *
29  46  2049            TCY 6       IF THERE HAVE BEEN AT LEAST 14 A-D READINGS
12  3E  2050            IMAC        SINCE THE END OF UNIDIRECTIONAL MOTION (I.E.
24  8F  2051            BR MOV17    IF A-D COUNT = 15), BRANCH TO MOV17 TO TEST
08  28  2052            LDX 0       FOR OUT OF MOTION. IF NOT, TEST AVERAGE A-D
11  47  2053            TCY 14      READING TO SEE IF IT IS GREATER THAN
22  21  2054            TMA         11,263. IF MSD IS 3 OR GREATER, THEN AVGE
04  73  2055            A13AAC      IS > 12,287, & SCALE IS STILL IN MOTION.
09  99  2056            BR MOTION3  IF MSD = 2, GO TO TEST 2ND DIGIT. IF MSD
13  70  2057            IAC         < 2 PROCEED TO TEST FOR OUT OF MOTION.
26  80  2058            BR DIGIT2
0C  8F  2059            BR MOV17
        2060    *
19  03  2061    BORROW  XMA
32  77  2062            DAN
25  03  2063            XMA
0A  04  2064            DYN
15  27  2065    GR10    TAM
2A  28  2066            LDX 0
14  3E  2067            IMAC
28  27  2068            TAM
10  BA  2069            BR CONV1
        2070    *
        2071    *
        2072    *
        2073            PAGE
        2147    *
        2148    *
        2149    *
00  2A  2150    ADREAD3 LDX 2       SET TIME SLOT AVAILABLE FLAG (RBIT).
01  4A  2151            TCY 5       IT WILL BE CANCELLED (SBIT) IN SIM
03  37  2152            RBIT 3      IF TIME SLOT NOT AVAILABLE.
        2153    *
        2154    *   READ A-D INTO MEMORY 0-8,9,10,11
07  28  2155    ADREAD  LDX 0
0F  43  2156            TCY 12
1F  23  2157            TYA
3F  0A  2158            TDO
3E  08  2159            TKA         A-D BUSY.DIAGNOSTIC.PRT CONN.PRT BUSY
3D  46  2160            TCY 6
3B  27  2161            TAM
37  3B  2162            TBIT1 3
2F  87  2163            BR ADREAD   A-D BUSY?YES,BR
        2164    *
1E  4D  2165            TCY 11
3C  2A  2166    ADREA1  LDX 2
39  23  2167            TYA
33  73  2168            A13AAC      A=Y-3 SINCE K(0=8-11) ARE TO BE
        2169    *                   PLACED IN M(2,11-14)
27  0A  2170            TDO
0E  08  2171            TKA
        2172    *           LOAD NEW BINARY WEIGHT FROM K-INPUTS INTO
        2173    *           M(2,11-14), AND TRANSFER PREVIOUS BINARY
1D  03  2174            XMA         BINARY WEIGHT FROM M(2,11-14) TO M(7,11-14)
```

```
3A  2F  2175           LDX 7
35  25  2176           TAMIYC
2B  5F  2177           YNEC 15
16  BC  2178           BR ADREA1       LAST? NO, BR
2C  2A  2179           LDX 2
18  60  2180           TCMIY 0
30  41  2181           TCY 8
21  0C  2182           RSTR            RESET A-D START
02  0D  2183           SETR            SET A-D START
05  47  2184           TCY 14
0B  21  2185           TMA             BIT 2 OF K (0=11) INPUT IS INVERTED.
17  7C  2186           A4AAC
2E  27  2187           TAM
1C  37  2188           RBIT 3          THERE ARE ONLY 15 BITS
        2189   *
        2190   *  SCALE IN MOTION ROUTINE BEGINS HERE.  IT IS CONTINUED ON CH 1
        2191   *  PAGES 1,2,6, & 7.
        2192   *
38  45  2193   SIM1    TCY 10          SUBTRACT THE PRESENT A-D READING FROM TH
31  7F  2194           CLA             PREVIOUS A-D READING - M(7,11-14) - & PL
23  05  2195   SI1     IYC             THE DIFFERENCE IN M(7,11-14). THIS SUBTR
06  2A  2196           LDX 2           SERVES TWO PURPOSES.
0D  06  2197           AMAAC             (A) TO ASSIGN THE SIGN LABEL TO THE CU
1B  A9  2198           BR BOR1               A-D READING. A POSITIVE SIGN IS AS
36  2F  2199           LDX 7                 (SIGN FLAG - M(2,10,3) - IS RESET)
2D  3C  2200           SAMAN                 PRESENT RDG > PREVIOUS RDG, I.E.,
1A  A8  2201           BR NOBOR1             RESULT OF THE SUBTRACTION IS NEGAT
34  26  2202           TAMZA                 NEGATIVE LABEL IS ASSIGNED (M(2,10
29  70  2203   BOR1    IAC                   IF PRESENT RDG < PREVIOUS RDG, I.E
12  57  2204   INCYS1  YNEC 14               RESULT OF SUBTRACTION IS POSITIVE
24  A3  2205           BR SI1            (B) TO DETERMINE IF DIFFERENCE EXCEEDS
08  18  2206           LDP 1                 MOTION LIMIT (16 IF A-D RDG < 4096
        2207   *                             WISE 32).
        2208   *
11  77  2209           DAN             BRANCH IF NO BORROW (SIGN LABEL IS POSIT
22  80  2210           BR POSCHG       RESULT OF SUBTRACTION IS NEGATIVE. M(7,1
        2211   *                       CONTAINS COMPLEMENT OF DIFFERENCE.)
        2212   *
        2213   *  SIGN LABEL IS NEGATIVE OR ZERO. RESULT OF SUBTRACTION IS
        2214   *  POSITIVE OR ZERO.  M(7,11-14) CONTAINS THE ACTUAL
        2215   *  DIFFERENCE. NOW TEST FOR DIFFERENCE > 15 OR 31.
        2216   *
04  3F  2217           MNEZ            BRANCH IF MSD - M(7,14) - IS NOT ZERO. S
09  AD  2218           BR MTN          IN MOTION (EXCESSIVE OSCILLATION AMPLITU
13  4B  2219           TCY 13
26  3F  2220           MNEZ            BRANCH IF 2ND DIGIT - M(7,13) - IS NOT Z
0C  AD  2221           BR MTN          SCALE IS IN MOTION (EXCESSIVE OSCILLATIO
19  43  2222           TCY 12
32  07  2223           DMAN            IF 3RD DIGIT - M(7,12) - IS NOT ZERO, BR
25  B1  2224           BR NEGCHG2      TEST WHETHER > 1, & WHETHER A-D RDG < 40
        2225   *
        2226   *  DIFFERENCE IS < 16. OSCILLATION AMPLITUDE IS NOT EXCESSIVE.
        2227   *
0A  4D  2228           TCY 11
15  3F  2229           MNEZ            IF LSD - M(7,11) - IS NOT ZERO, THE SIGN
2A  92  2230           BR NEGATIVE     IS NEGATIVE. IF IT IS ZERO, THE OVERALL
14  A2  2231           BR COMPSIGN     DIFFERENCE IS ZERO; REVERSE THE SIGN LAB
        2232   *
28  26  2233   NOBOR1  TAMZA           SUBTRACTION BRANCH IF NO BORROW.
10  92  2234           BR INCYS1
        2235   *
        2236   *
        2237           END
```

In the normal operating mode of this embodiment, Criterion No. 2A with $\Delta=\pm 1\frac{1}{2}$ counts, together with the modifications described in Criteria Nos. 5 and 7, are used to determine whether the scale is in or out of motion and to control the updating of the primary target. (A count is the smallest possible increment in the digital signal from the A-D converter; a fraction of a count can occur in the computed average of several such signals.)

By setting the mode indicator register 121 [bit 2 of memory location M (7, 6)] equal to 1 through an external switch and the K-inputs to the microcomputer, the scale can be switched to an optional operating mode in which the motion indicator 101 and the updating of the secondary target are controlled by Criterion No. 2A, modified as described in Criteria Nos. 5, 6, and 7 with $\Delta_1=\pm 1\frac{1}{2}$ counts and $\Delta_2=-4.0$ or $+3\ 15/16$ counts. Updating of the primary target is still controlled by the criterion used in the normal operating mode.

In both operating modes a code 5 is inserted in the state code register 120 [memory location M (3,6)] if the scale is in unidirectional motion or if an average differs from the target by 12 counts or more, and code 0 is inserted if the difference is less than 12 counts but the scale is in motion. (Code 15 is inserted if the scale is out of motion.) This is in effect a third motion criterion included in the program, and is used to activate a printer.

With respect to the modification of Criterion No. 5, an out-of-motion status is not permitted until fourteen signals have been received after the end of unidirectional motion if the average of a group of signals is greater than 11,263 counts.

With respect to the modification of Criterion No. 7, the limit L, applied to the difference between successive signals, is −16 or +15 counts if the latest signal is less than 4096 counts and −32 or +31 counts if the latest signal is equal to or greater than 4096 counts.

In this embodiment, the microcomputer is required to perform other functions from time to time in addition to those required to implement the invention. This can cause irregularities in the timing of successive signals. In order to avoid errors which might otherwise result from such irregularities, the check flag register 122 [bit 2 of memory location M (0,7)] is normally maintained equal to 1, but is reset to 0 whenever such a timing irregularity occurs. On completion of the cycle of oscillation (averaging interval), this bit is tested in subroutine "MOV2CK" (Ch. 1, p. 13) and if such an irregularity is found to have occurred during the cycle, all of the signals which occurred during that cycle are discarded and ignored instead of being averaged.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A method for determining a representative average weight reading based on a series of weight readings from a scale subject to vibrations comprising the steps of generating signals at regular intervals representative of the weight readings from said scale, and averaging the weight signals occurring during one complete vibrational cycle, or integral multiple thereof.

2. A method for determining a representative average weight reading based on a series of weight readings from a scale subject to vibrations comprising the steps of generating signals at regular intervals representative of the weight readings from said scale, comparing each new weight signal with the previous weight signal, assigning one of two alternative labels to each new weight signal according to whether it is greater or less than the previous weight signal, and assigning the opposite of the previous label if the signals are equal, and averaging the weight signals occurring in a weight averaging interval which extends from a label change in one direction to the next label change in the same direction.

3. A method for determining a representative average weight reading based on a series of weight readings from a scale subject to vibrations comprising the steps of generating at regular intervals signals representative of the weight readings from said scale, comparing each new weight signal with the previous weight signal, assigning one of two alternative labels to each new weight signal according to whether it is greater or less than the previous weight signal, and assigning the opposite of the previous label if the signals are equal, and counting the number of weight signals occurring in a weight averaging interval which extends from a label change in one direction to the next label change in the same direction, and includes one intervening label change in the opposite direction, and accumulating a total of the magnitudes of the weight signals generated during said weight averaging interval, and dividing the accumulated total of the weight signals by the number of weight signals occurring during said weight averaging interval thereby to provide an average weight reading.

4. Apparatus for determining a representative average weight reading from a series of weight readings from a scale subject to vibrations comprising means for generating signals at regular intervals representative of the weight readings from said scale, and means for comparing each new weight signal with the previous weight signal and for assigning one of two alternative labels to each new weight signal according to whether it is greater or less than the previous weight signal, and for assigning the opposite of the previous label if the signals are equal, and means for averaging the weight signals occurring in a weight averaging interval extending from a label change in one direction to the next label change in the same direction.

5. The apparatus of claim 4 wherein said means for averaging the weight signals includes counter means responsive to said comparing means for counting the number of weight signals occurring in said weight averaging interval, means for accumulating the total of the magnitudes of the weight signals occurring during the weight averaging interval, and means for dividing the accumulated total of the weight signals by the number of weight signals occurring during the weight averaging interval thereby to provide an average weight reading.

6. An apparatus for providing a representative digital average weight reading from a series of weight readings from a scale subject to vibrations comprising means for generating an analog voltage signal representative of the weight reading from said scale, and converter means for repeatedly generating digital weight signals in response to said analog voltage signal, means for comparing each new digital weight signal with the previous digital weight signal and for assigning one of two alternative labels to each new weight signal according to whether it is greater or less than the previous weight signals, and for assigning the opposite of the previous label if the signals are equal, and means for determining a digital average weight reading including counter means responsive to said comparing means for counting the number of digital weight signals occurring in a weight averaging interval extending from a label change in one direction to the next label change in the same direction, and including one intervening label change in the opposite direction, means responsive to the output of said counter means for accumulating a total of the magnitudes of the weight signals generated during the weight averaging interval, and means for dividing the accumulated total of the weight signals by the number of weight signals occurring during the weight averaging interval thereby to provide a digital average weight reading.

7. An apparatus for determining motion in a weighing scale comprising means for generating signals at regular intervals representative of weight readings from said scale, and means for comparing each new weight signal with the previous weight signal and for assigning one of two alternative labels to each new weight signal according to whether it is greater or less than the previous weight signal, and for assigning the opposite of the previous label if the signals are equal, means for averaging the weight signals occurring in a weight averaging interval extending from a label change in one direction to the next label change in the same direction, means for comparing the most recent average weight signal with a previous average weight signal, and means for indicating scale-in-motion when the difference in average weight signals exceeds a predetermined amount.

8. Apparatus for determining motion in a weighing scale comprising means for generating an analog voltage signal representative of the weight on said scale, means responsive to said analog voltage signal for generating digital weight signals at regular intervals, means for comparing each new weight signal with the previous weight signal and for assigning one of two alternative labels to each new weight signal according to whether it is greater or less than the previous weight signal, and for assigning the opposite of the previous label if the signals are equal, counter means for recording the number of successive weight signals of the same label, and means for indicating scale-in-motion when the number in said counter means exceeds a predetermined number, means for averaging the weight signals occurring in a weight averaging interval extending from a label change in one direction to the next label change in the same direction when the number in said counter means does not exceed said predetermined number, and means for comparing the most recent digital average weight signal with a previous digital average weight signal, and further means for indicating scale-in-motion when the difference in average weight signals exceeds a predetermined amount.

* * * * *

UNITED STATES PATENT AND TRADEMARK OFFICE
CERTIFICATE OF CORRECTION

PATENT NO. : 4,379,495
DATED : April 12, 1983
INVENTOR(S) : Michael H. Cocks and Gary A. Evans It is certified that error appears in the above—identified patent and that said Letters Patent is hereby corrected as shown below:

Col. 1, line 66, "impedes" should read -- imposes --;

Col. 3, line 17, "However" should read -- (However --;

Col. 5, line 14, "circuit 50" should read -- circuit 60 --;
    line 25, "scale-in motion" should read
        -- scale-in-motion --;

Col. 6, line 29, "from cycle" should read -- from one cycle --;

Col. 7, line 23, "signal and" should read -- signal, and --;

Col. 9, line 16 "5h illustrates" should read -- 5h which illustrates --;

Col. 10, line 7, "cycle)." should read -- cycle.) --;

Col. 11, line 30, "equal or or" should read -- equal to or --; and
    line 31, "get back" should read -- go back --.

Signed and Sealed this

Twenty-seventh Day of December 1983

[SEAL]

Attest:

GERALD J. MOSSINGHOFF

Attesting Officer    Commissioner of Patents and Trademarks